United States Patent
Nakahara et al.

(10) Patent No.: US 8,170,130 B2
(45) Date of Patent: May 1, 2012

(54) TRANSMISSION METHOD AND TRANSMISSION SYSTEM

(75) Inventors: Hideki Nakahara, Hyogo (JP); Hitoshi Takai, Osaka (JP); Koichiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 967 days.

(21) Appl. No.: 11/886,072

(22) PCT Filed: Mar. 24, 2006

(86) PCT No.: PCT/JP2006/306003
§ 371 (c)(1),
(2), (4) Date: Sep. 11, 2007

(87) PCT Pub. No.: WO2006/104054
PCT Pub. Date: Oct. 5, 2006

(65) Prior Publication Data
US 2008/0212706 A1  Sep. 4, 2008

(30) Foreign Application Priority Data

Mar. 28, 2005  (JP) ................. 2005-090889

(51) Int. Cl.
*H04B 7/02*  (2006.01)

(52) U.S. Cl. ........ 375/267; 375/260; 375/262; 375/340; 375/343; 375/347

(58) Field of Classification Search ............. 375/267, 375/260, 262, 340, 347; 370/203, 204, 205, 370/208, 209, 210; 455/132
See application file for complete search history.

(56) References Cited

U.S. PATENT DOCUMENTS

| | | | |
|---|---|---|---|
| 4,856,025 A | 8/1989 | Takai | |
| 5,394,435 A | 2/1995 | Weerackody | |
| 5,454,012 A * | 9/1995 | Takai et al. | 375/295 |
| 6,892,059 B1 | 5/2005 | Kim et al. | |
| 6,996,191 B1 * | 2/2006 | Meditz | 375/308 |

FOREIGN PATENT DOCUMENTS

| | | |
|---|---|---|
| JP | 62-214743 | 9/1987 |
| JP | 2 506 747 | 4/1996 |
| JP | 2 506 748 | 4/1996 |
| JP | 2001-102976 | 4/2001 |
| JP | 2004-165784 | 6/2004 |
| WO | 2004/038987 | 5/2004 |

OTHER PUBLICATIONS

Akira Hiroike et al., "Combined Effects of Phase Sweeping Transmitter Diversity and Channel Coding", IEEE Transactions on Vehicular Technology, vol. 41, No. 2, May 1992, IEEE, USA, pp. 170-176.
International Search Report for PCT/JP2006/306003 mailed on May 16, 2006.

* cited by examiner

*Primary Examiner* — Dhaval Patel
(74) *Attorney, Agent, or Firm* — Wenderoth, Lind & Ponack, L.L.P.

(57) ABSTRACT

A transmission device includes a differential encoding section for differentially encoding transmission data, a first waveform generation section, a second waveform generation section, and two transmission antennas. A reception device includes a reception antenna, a delay detection section, and a data determination section for low-pass filtering a delay detection signal. The reception device receives modulated signals modulated by using two waveforms having low correlations with each other. Thus, regardless of the presence or absence of delay dispersion in a propagation path and even in a high-speed fading in which the propagation path varies at high speed, a transmission diversity effect can be achieved, thereby making it possible to improve transmission characteristics.

17 Claims, 33 Drawing Sheets

TRANSMISSION METHOD AND TRANSMISSION SYSTEM

TECHNICAL FIELD

The present invention relates to a transmission method and transmission system, in the field of radio communications, using a transmission diversity which transmits signals through a plurality of transmission antennas.

BACKGROUND ART

In the field of radio communications, there is an antenna diversity technique for improving a transmission characteristic by transmitting/receiving signals through a plurality of antennas. Such an antenna diversity technique has a transmission diversity in which signals are transmitted through a plurality of transmission antennas at a transmission side, and a reception diversity in which signals are received through a plurality of reception antennas at a reception side. The transmission diversity is a technique for improving the transmission characteristics at the reception side by forming a plurality of propagation paths, having low correlations with each other, between the transmission side and the reception side. The reception diversity is a technique for improving reception characteristics by selecting a signal from among a plurality of signals received through the reception antennas or by combining the plurality of signals. Particularly, in a transmission method which has a single reception antenna and uses only the transmission diversity for the transmission, the transmission characteristics can be improved without increasing a size or cost required for the antenna of a receiver to be disposed. Therefore, the aforementioned transmission method is effective for a cellular mobile communication system which imposes a greater restriction on a mobile terminal than a base station.

However, in radio transmissions which use the transmission diversity, a plurality of reception signals cancel each other out and disappear due to a phase relationship between the plurality of reception signals received at the reception side, thereby resulting in a problem that the transmission characteristics deteriorates. Note that in the following descriptions, a signal transmitted from a transmission antenna is referred to as a "transmission signal", and the transmission signal received by a reception antenna via a propagation path is referred to as an "incoming signal".

FIG. 21 is a diagram illustrating a phase relationship between two incoming signals A and B which are to be combined with each other at a reception end. As shown in (a) of FIG. 21, a received wave is formed by combining the incoming signal A with the incoming signal B so as to have a phase difference α therebetween. Therefore, when α=180 degrees (reversed phase) is satisfied, the incoming signal A and the incoming signal B cancel each other out, thereby causing the received wave to disappear ((b) of FIG. 21). Particularly, when a conventional phase modulation scheme in which a phase is constant during one symbol is used for the radio communications, the incoming signals cancel each other out during the entire symbol period, thereby eliminating a detection output. As a result, a transmission error occurs. FIG. 22 is a schematic diagram illustrating a phase relationship between the two incoming signals A and B obtained when the phase difference α=180 degrees is satisfied in the conventional phase modulation scheme.

Conventionally, as a transmission method which uses the transmission diversity based on the conventional phase modulation scheme, non-patent document 1 discloses a method in which transmission data is encoded by using time interleave and an error correction code so as to perform transmission by sweeping a phase of a signal to be transmitted from one of two transmission antennas, for example. FIG. 23 is a diagram illustrating a structure of a transmission system which uses the conventional transmission diversity disclosed in non-patent document 1. Note that a conventional QDPSK (Quaternary Differential Phase Shift Keying) is used as the modulation scheme.

In FIG. 23, a divider 301 distributes a transmission signal 310 transmitted from a transmitter 300 into two transmission signals 311 and 312, and then transmits the transmission signals 311 and 312 to two antenna blocks, respectively. An oscillator 303 generates a predetermined phase swept signal 313. A phase shifter 302 is provided in one of the two antenna blocks, and transmits, from an antenna 305, a transmission signal 314 generated by adding a transmission signal 312 to the phase swept signal 313. As a time function of the phase swept signal 313 to be added, a variation, having a length longer than a symbol length and shorter than a code length of the error correction code or a time interleave length, is selected. Note that the variation is asynchronous with a symbol period, and is different from a predetermined phase transition occurred during a time period corresponding to the symbol length, as disclosed in patent document 1 to be described later. Furthermore, in addition to the transmission diversity having the aforementioned structure, the transmission data is encoded by using the error correction code.

As described above, in the transmission method which uses the conventional transmission diversity disclosed in non-patent document 1, the transmission is performed by previously varying a phase of a signal transmitted from the transmission side, thereby shortening a time period, as shown in FIG. 22, during which a state where the incoming signals transmitted from the two transmission antennas cancel each other out, continues. Therefore, even if an error occurs, the error can be corrected by means of the time interleave and an error correction processing.

Further, in a modulation scheme, used in a transmission method disclosed in patent document 1, which is focused on a symbol waveform (phase waveform during a symbol), a phase of the symbol waveform synchronized with a symbol period T has a convex phase transition, and a detection output is obtained by performing delay detection, thereby eliminating a state where the detection output disappears due to a multipath. Furthermore, with an effect produced by combining the multipath, even the transmission characteristics can be improved. This improved effect is fundamentally effective when a delay amount τ of a delayed wave is within a predetermined range (0<τ<T).

FIG. 24 is a schematic diagram illustrating a phase transition of the symbol waveform disclosed in patent document 1. In the phase transition shown in FIG. 24, a transition width within a time length T (a symbol length) corresponding to one symbol is set up to a maximum phase transition amount $\phi_{MAX}$, and a phase is changed in a parabola shape based on a function shown by the following formula (1).

$$\phi(t)=(4\phi_{MAX}/T^2)\cdot t\cdot(T-t);(0<t<T) \quad (1)$$

FIG. 25 is a diagram illustrating a structure of a transmission signal generation circuit 700 disclosed in patent document 1. As shown in FIG. 25, the transmission signal generation circuit 700 includes a differential encoding circuit 701, a waveform generation circuit 702, a quadrature modulator 704 and an oscillator 703. The transmission signal generation circuit 700 causes the differential encoding circuit 701 to differentially encode transmission data, the waveform generation circuit 702 to modulate the differentially encoded data by means of a symbol waveform having a convex phase redundancy, and the quadrature modulator 704 to convert the modulated data into a signal having a carrier wave frequency band.

Next, a phase relationship between incoming signals obtained when using a symbol waveform having such a convex phase redundancy will be described.

FIG. 26 is a schematic diagram illustrating a phase relationship between the two incoming signals A and B obtained when using the symbol waveform having the convex phase redundancy. In FIG. 26, it is assumed that the phase difference α is 180 degrees. In this case, even when there is a delay between the incoming signals, phases of the respective incoming signals are shifted in a convex manner. Therefore, within an effective interval (an interval in which correct received data can be obtained), while there is an interval in which the incoming signals cancel each other out and a received wave disappears (a point b of FIG. 26), there is also another interval in which the incoming signals do not cancel each other out and the received wave remains (a point a or c of FIG. 26). The incoming signals A and B are processed by means of a combination of delay detection and a low-pass filter, thereby making it possible to obtain an effective detection output. As a result, the transmission characteristics can be improved by obtaining a path diversity effect.

FIG. 27 is a schematic diagram illustrating a structure of a conventional transmission system which uses the transmission diversity based on a modulation scheme disclosed in patent document 1. As shown in FIG. 27, a delay unit 901 is provided among the transmission signal generation circuit 700, a first aerial 904 and a second aerial 905, thereby interposing a delay between signals to be transmitted from the first antenna 904 and the second antenna 905. In this case, a delay amount interposed between the signals to be transmitted is set such that the path diversity effect is well obtained. Thus, the transmission characteristic can be improved.

[patent document 1] patent application U.S. Pat. No. 2,506,747

[non-patent document 1] Akira Hiroike, "Combined Effects of Phase Sweeping Transmitter Diversity and Channel Coding", IEEE TRANSACTIONS ON VEHICULAR TECHNOLOGY, VOL. 41, NO. 2, May 1992, IEEE, USA, pages 170-176

SUMMARY OF THE INVENTION

Problems to be Solved by the Invention

The conventional transmission method disclosed in non-patent document 1 is only effective when delay dispersion in a propagation path relative to a symbol length can be ignored. However, when the delay dispersion relative to the symbol length cannot be ignored, the conventional differential phase modulation scheme in which a phase is constant during one symbol is used, whereby the detection output may not be obtained depending on a phase relationship between the incoming signal A and the incoming signal B, thereby resulting in the deterioration of transmission characteristics. FIG. 28 is a schematic diagram illustrating a phase relationship between two incoming wave signals which are to be combined with each other at a reception end in the conventional phase modulation scheme. As shown in FIG. 28, in a case where the delay amount between the incoming signal A and the incoming signal B is 0.25 T, when α=180 degrees (reversed phase) is satisfied, the incoming signals cancel each other out, thereby causing a received wave to disappear in the entire interval (effective interval), in which the correct received data can be obtained, included in a same symbol interval shared between the incoming signals. As such, in a state where portions of the incoming signals transmitted from two transmission antennas cancel each other out, even if a phase variation is provided between the transmission antennas, the phase relationship between the incoming signals transmitted through the propagation paths is not to be improved. Therefore, the detection output cannot be recovered and a transmission error occurs.

Furthermore, according to the transmission method, in which the modulation scheme, disclosed in patent document 1, having the phase transition synchronous with the symbol is adopted for the transmission diversity without interposing any delay, in a case where the delay dispersion in the propagation path can be ignored, even if levels of the incoming waves transmitted from a plurality of transmission antennas are secured, the two incoming signals cancel each other out when a phase relationship between the two incoming signals is reversed. Thus, the path diversity effect cannot be obtained.

FIG. 29 is a schematic diagram illustrating a case where a phase relationship between the incoming signals is reversed in the modulation scheme disclosed in patent document 1. As shown in FIG. 29, even if a phase transition of each of the incoming signals has a convex shape, the detection output disappears when there is no delay between the two incoming signals and a phase relationship between the two incoming signals is reversed. Thus, an improved effect cannot be obtained.

FIG. 30 is a schematic diagram illustrating a relationship between a bit error rate and the delay amount X in the transmission scheme disclosed in patent document 1. In FIG. 30, the horizontal axis represents the delay amount between incoming signals in a two-incoming-wave model and the vertical axis represents the bit error rate. As described with reference to FIG. 29, when the delay amount τ between the two incoming waves is small, the improved effect cannot be obtained if a phase relationship between the incoming waves is reversed, thereby deteriorating an error rate. The bit error rate is improved as the delay amount τ is relatively increased, and the effective interval becomes shorter as the delay amount τ becomes equal to the symbol length T. Then, the effective interval finally disappears and the bit error rate starts to deteriorate again.

Patent document 1 discloses the method in which the transmission diversity is realized by intentionally interposing a predetermined delay between the transmission signals (FIG. 27). Taking into consideration a path difference between the propagation paths, and assuming that delay dispersion is added to each of the propagation paths, the delay amount interposed by the delay unit 901 is set, as shown by τS in FIG. 30, to be a value corresponding to a center of the bottom of an error rate characteristic curve (a satisfactory error rate segment). Considering a resistance to the delay dispersion (delay resistance) occurred in each of the propagation paths, however, when the conventional transmission diversity is used, there is a problem in that a relatively large delay τS must be previously interposed between the transmission signals at the transmission side against an amount of delay resistance, indicated by the "satisfactory error rate segment", which is a capacity obtained when using the conventional modulation scheme, and thus the amount of delay resistance is substantially decreased.

Therefore, for solving the aforementioned problem, an object of the present invention is to provide a transmission method and transmission system realized by the transmission diversity capable of, regardless of the presence or absence of delay dispersion in a propagation path, having a larger delay resistance to the propagation path even if the delay dispersion occurs in the propagation path, and capable of substantially improving an error rate by obtaining the path diversity effect.

Solution to the Problems

The present invention is directed to a transmission method of transmitting modulated signals modulated based on same transmission data from a transmission side to a reception side by using a plurality of transmission antennas. In order to attain the object mentioned above, at the transmission side, the transmission method according to the present invention comprises the steps of generating a plurality of modulated signals in which symbol waveforms during a same symbol period are different from each other based on the transmission data, and transmitting the plurality of modulated signals thus generated from the plurality of transmission antennas, respectively. At the reception side, the transmission method according to the present invention comprises the steps of receiving a plurality of incoming signals transmitted from the plurality of transmission antennas by a reception antenna, detecting the received modulated signals, and decoding detection signals obtained by the detection so as to obtain received data.

Typically, at the transmission side, the plurality of modulated signals, in which the symbol waveforms of any two symbols separated from each other by a predetermined number of symbols are identical with each other regardless of the transmission data and in which a phase difference between the any two symbols is determined based on the transmission data, are generated. Here, the modulated signals may be generated when the predetermined number of symbols is set to be 1. Furthermore, it is preferable that any angle obtained by equally dividing $2\pi$ by a number corresponding to a power of 2 is used as the phase difference. Still furthermore, each phase may be further shifted clockwise or counterclockwise by a predetermined amount (i.e., phases may be symmetrically disposed with each other) for each adjacent symbol, and information may be further loaded in an amplitude direction in accordance with the transmission data. It is desirable that the detection signals are obtained by performing a delay detection at the reception side.

Furthermore, at the transmission side, if a second-order differential coefficient representing a chronological change of a phase is not always zero during the one symbol period and the chronological change of the phase is different for each transmission block, any combination of phase transitions may be used as the symbol waveforms from which a plurality of transmission signals are to be generated.

Specifically, such as a first symbol waveform having a phase which increases in a chronological direction and having a phase transition in which a second-order differential coefficient representing a chronological change of the phase is not always zero during one symbol period, and a second symbol waveform having a phase which decreases in the chronological direction and having a phase transition in which the second-order differential coefficient representing the chronological change of the phase is not always zero during the one symbol period, for example, it is preferable to select the waveforms having transitions different from each other. Furthermore, each of the first and second symbol waveforms preferably has the phase transition in which an amount of the chronological change of the phase (a first-order differential coefficient) decreases (or increases) before a predetermined point during the one symbol period and increases (or decreases) after the predetermined point during the one symbol period.

Alternatively, such as a first symbol waveform having a phase which increases in a chronological direction before a predetermined point during one symbol period and decreases after the predetermined point during the one symbol period, and having a phase transition in which a second-order differential coefficient representing a chronological change of the phase is not always zero, and a second symbol waveform having a phase which decreases in the chronological direction before the predetermined point during the one symbol period and increases after the predetermined point during the one symbol period, and having a phase transition in which the second-order differential coefficient representing the chronological change of the phase is not always zero, for example, it is preferable to select the waveforms having transitions different from each other. In this case, it is preferable that each of the waveforms has the phase transition in which an amount of the chronological change of the phase decreases (or increases) during an entirety of the one symbol period.

More preferably, when the predetermined point is set at a center of the one symbol period, the waveforms have the phase transitions in which the phases before the center of one symbol period and the phases after the center of the one symbol period are symmetrically changed.

Also, the present invention is directed to a transmission system comprised of a transmission device which transmits modulated signals modulated based on same transmission data by using a plurality of transmission antennas and a reception device which receives the modulated signals transmitted from the transmission device by a reception antenna. In order to attain the object mentioned above, in the transmission system of the present invention, the transmission device includes: a differential encoding section for differentially encoding the transmission data and generating differentially encoded signals; a plurality of waveform generating sections for respectively modulating the differentially encoded signals by means of a plurality of symbol waveforms which are previously stored therein and generating a plurality of modulated signals, in which symbol waveforms during a same symbol period are different from each other; a plurality of RF quadrature modulation sections for respectively performing quadrature modulation on the plurality of modulated signals so as to be converted into radio frequency band; and a plurality of transmission antennas for respectively transmitting the plurality of modulated signals whose frequency bands have been converted into radio frequency band. The reception device includes: a reception antenna for receiving the plurality of signals transmitted from the plurality of transmission antennas; a delay detection section for performing a delay detection process and low-pass filtering process on the received signals, and generating detection signals; and a data determination section for determining data of the detection signals and outputting received data.

EFFECT OF THE INVENTION

According to the present invention, a differential encoding is performed on one transmission data sequence, modulation is performed by using different symbol waveforms, and signals thus obtained are transmitted from a plurality of transmission antennas. Therefore, it is unnecessary to adjust a timing at which a delay is intentionally interposed between the transmission signals transmitted from the respective transmission antennas, and regardless of the presence or absence of delay dispersion in a propagation path, a larger delay resistance to the propagation path can be obtained even if the delay dispersion occurs in the propagation path. Or even in a high-speed fading in which the propagation paths vary at high speed, a path diversity effect can be achieved at the reception side, thereby making it possible to improve transmission characteristics.

Figure 1:
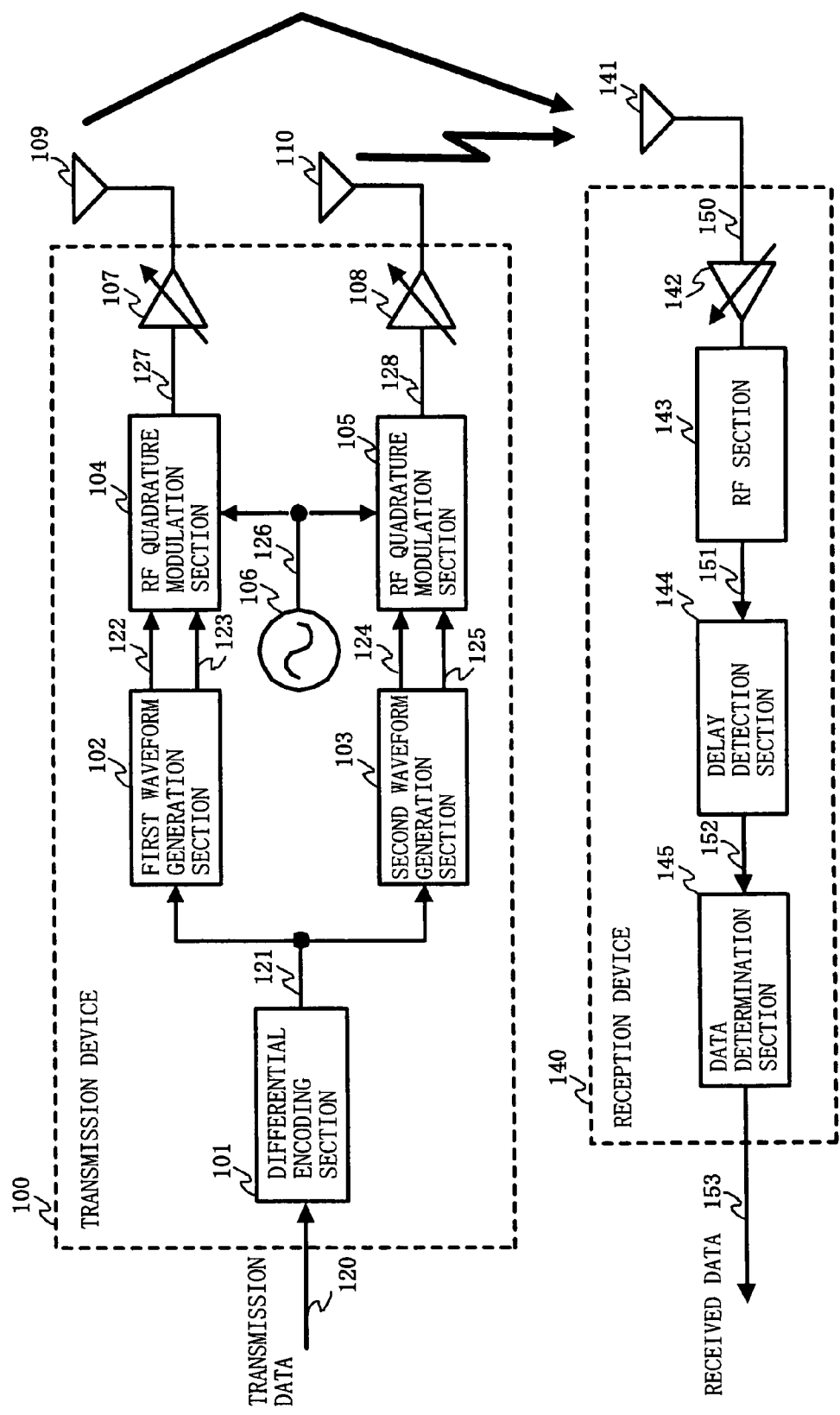
FIG. 1 is a diagram illustrating a structure of a transmission system according to an embodiment of the present invention.

DESCRIPTION OF THE REFERENCE CHARACTERS 100 transmission device
101, 701 differential encoding section (circuit)
102, 103 waveform generation section
104, 105 RF quadrature modulation section
106, 303, 703, 1081 oscillator
107, 108, 142 amplifier
109, 110, 141, 304-306, 904, 905 antenna
140 reception device
143 RF section
144 delay detection section
145 data determination section
300 transmitter
301 divider
302 phase shifter
307 receiver
700 transmission signal generation circuit
702 waveform generation circuit
704 quadrature modulator
901, 1601 delay unit
902, 903 level controller
1501, 1502 balanced modulator
1503, 1604, 1605 phase shifter
1504 synthesizer
1606, 1607, 1810, 1811 low-pass filter 1602, 1603 multiplier
1802 L divider
1803, 1804 counter
1805, 1806 shift register
1807 waveform storage section
1808, 1809 D/A converter

DETAILED DESCRIPTION OF THE INVENTION

The present invention is applicable to a transmission system which uses a transmission diversity having a plurality of transmission antennas and which performs differential encoding using the number of phases equal to a power of 2. Hereinafter, the present invention will be described by taking as an example a case where a four-phase differential encoding is performed by using two transmission antennas. Note that each of the phases may be further shifted clockwise or counterclockwise by a predetermined amount (i.e., the phases may be symmetrically disposed with each other) for each adjacent symbol, and a Differential Amplitude Phase Shift Keying (DAPSK), which further loads information in an amplitude direction in accordance with the transmission data, may be used.

Figure 20:
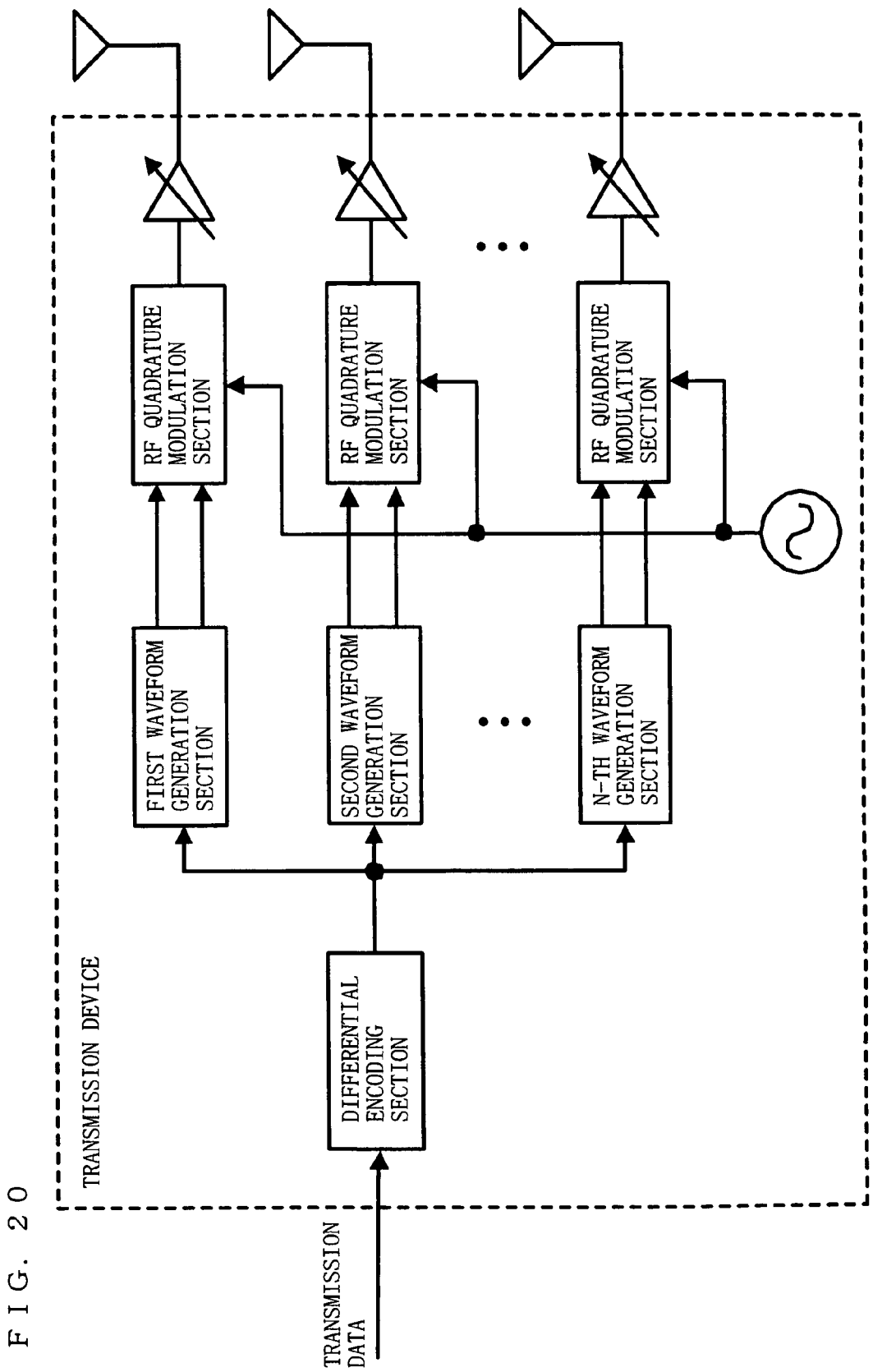
FIG. 20 is a diagram illustrating an exemplary transmission system having a plurality of waveform generation sections and transmission antennas.
Figure 21:
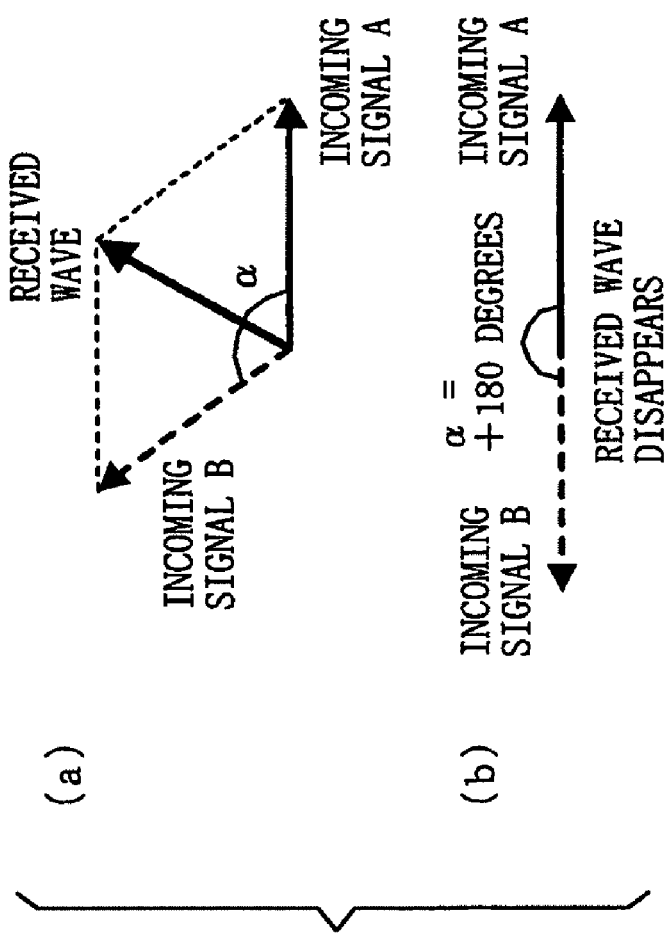
FIG. 21 is a diagram illustrating a phase relationship between two incoming signal A and B which are to be combined with each other at a reception end.
Figure 22:
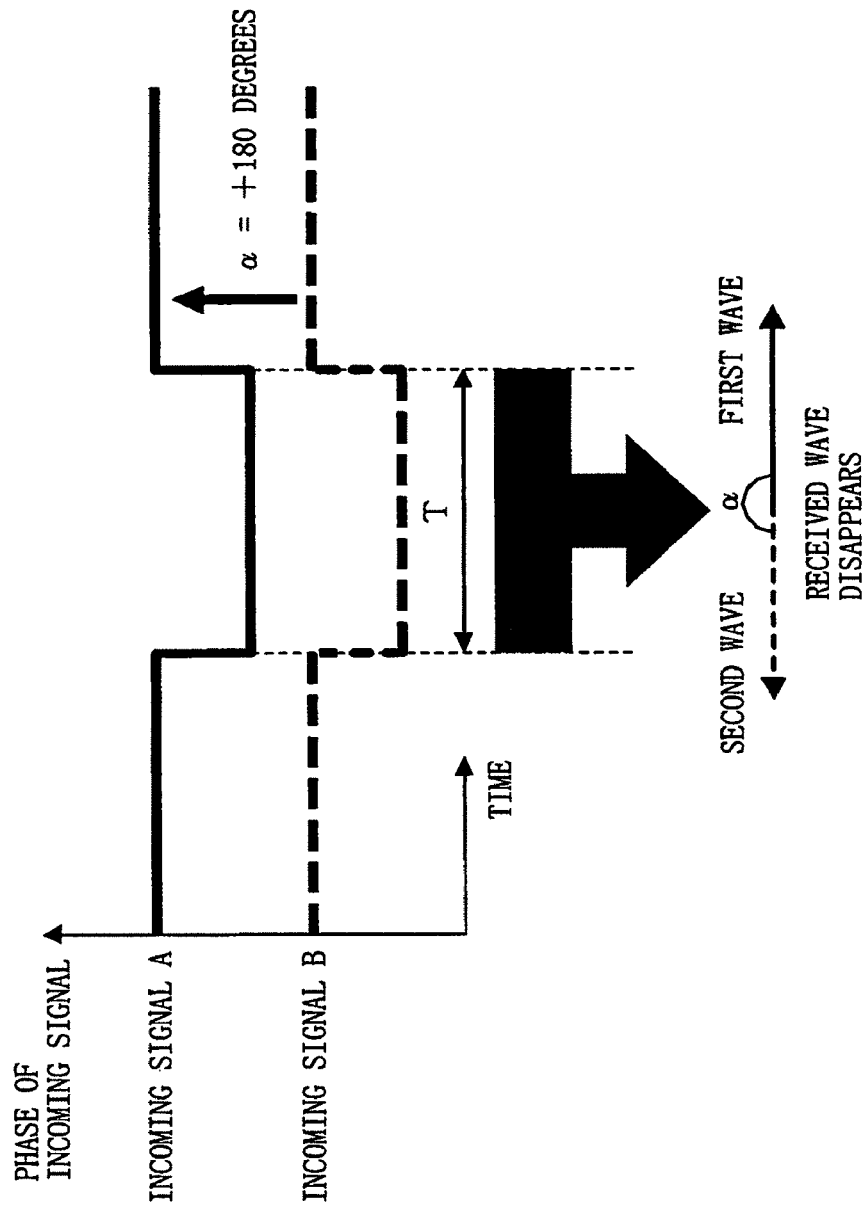
FIG. 22 is a schematic diagram illustrating a phase relationship between the two incoming signals A and B obtained when a phase difference $\alpha=180$ degrees is satisfied in a conventional phase modulation scheme.
Figure 23:
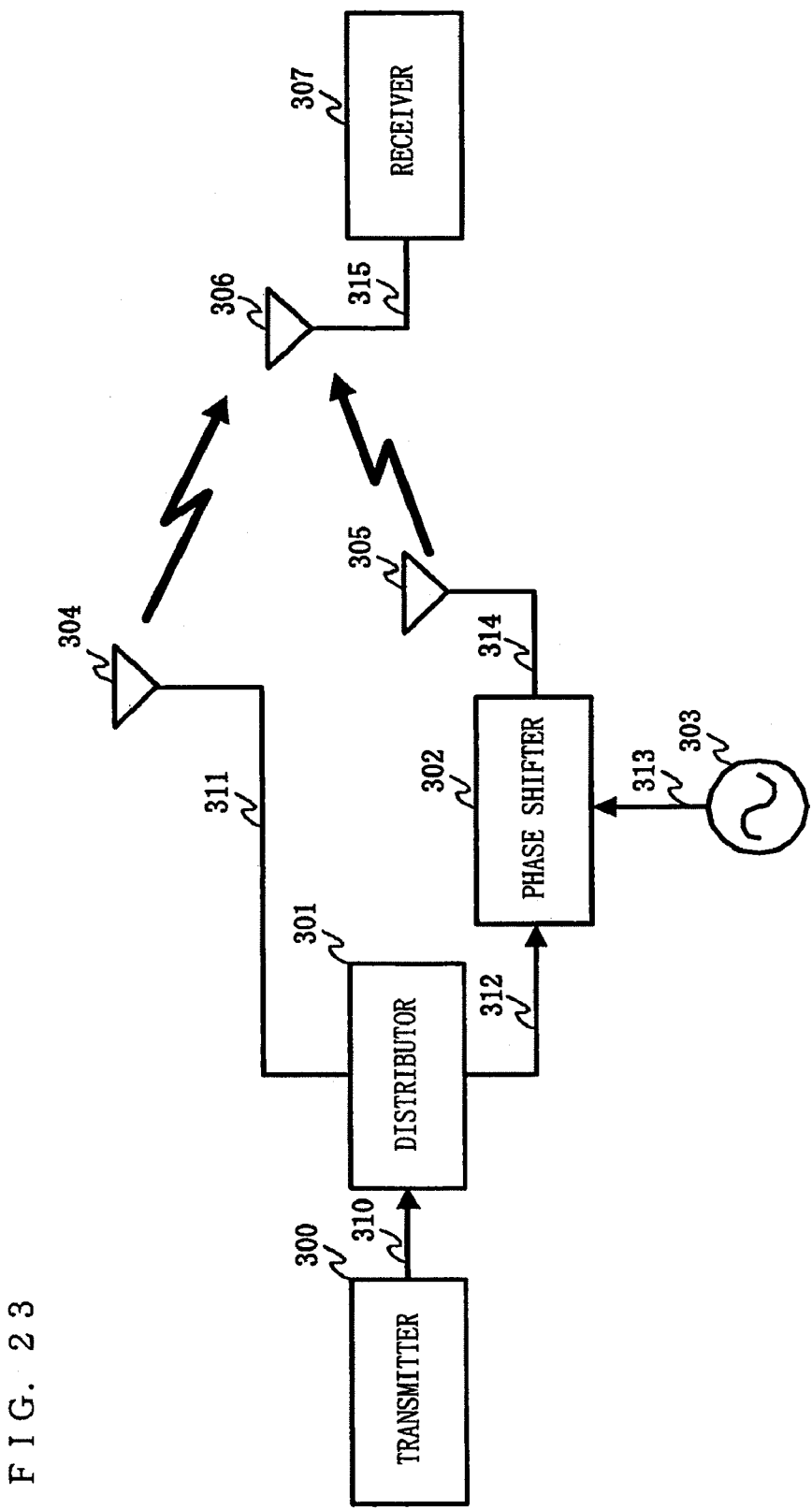
FIG. 23 is a diagram illustrating a structure of a conventional transmission system.
Figure 24:
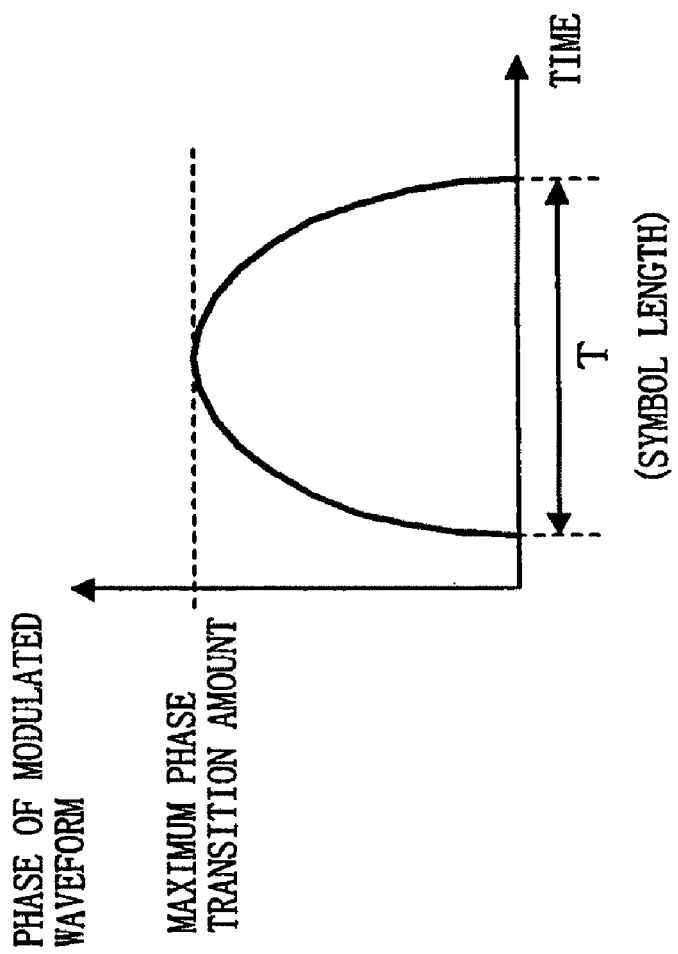
FIG. 24 is a schematic diagram illustrating a phase transition of a conventional symbol waveform.
Figure 25:
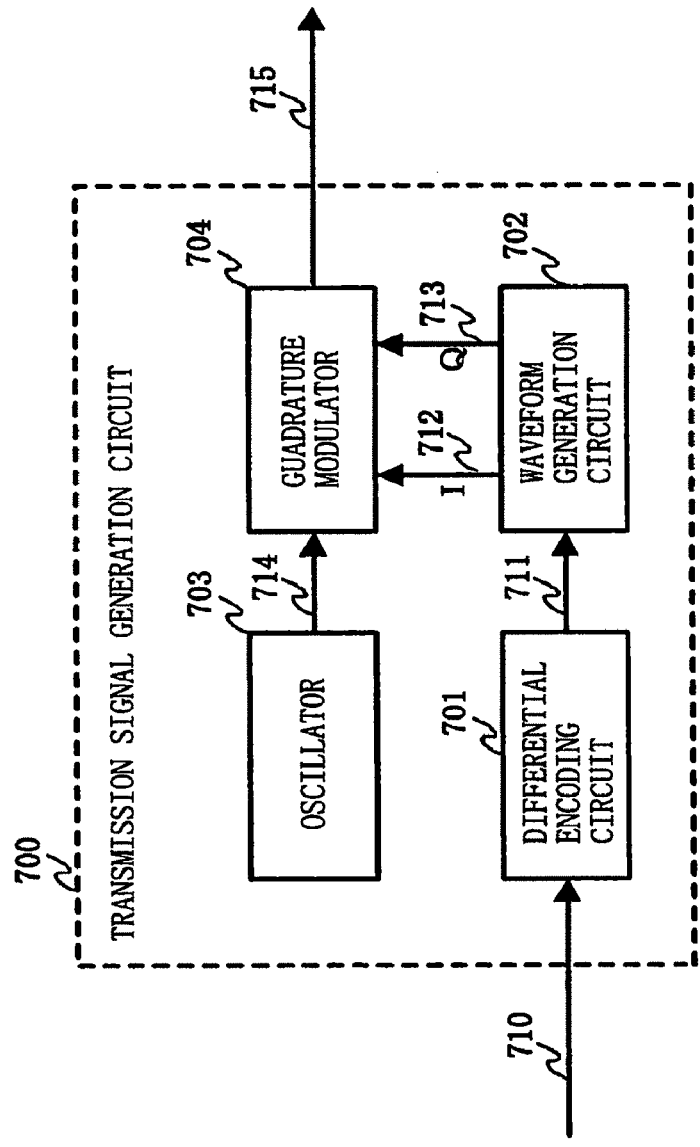
FIG. 25 is a diagram illustrating a structure of a transmission signal generation circuit 700 shown in FIG. 27.
Figure 26:
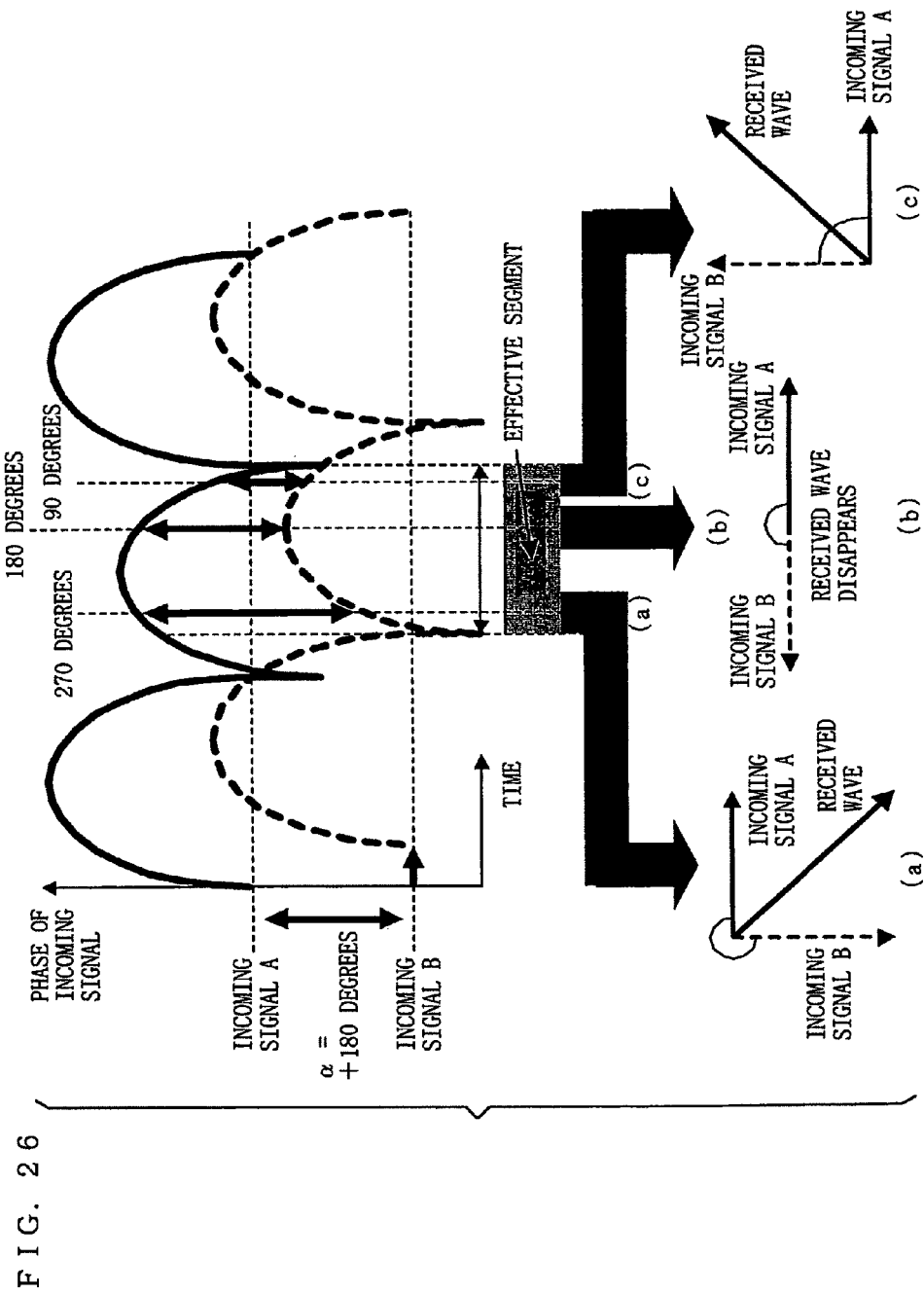
FIG. 26 is a schematic diagram illustrating a phase relationship between the incoming signals A and B having a delay therebetween.

FIG. 1 is a diagram illustrating a structure of a transmission system according to an embodiment of the present invention. In the transmission system according to the present embodiment shown in FIG. 1, a transmission device 100 is communicated with a reception device 140 via radio propagation paths. The transmission device 100 includes a differential encoding section 101, a first waveform generation section 102, a second waveform generation section 103, an oscillator 106, RF quadrature modulation sections 104 and 105, amplifiers 107 and 108, and transmission antennas 109 and 110. The reception device 140 includes a reception antenna 141, an amplifier 142, an RF section 143, a delay detection section 144, and a data determination section 145. Note that FIG. 1 illustrates an example where the transmission device 100 includes two transmission blocks, each including the waveform generation section, the RF quadrature modulation section, the amplifier and the transmission antenna. However, the present invention is not limited thereto. The transmission device 100 may include three or more transmission blocks (FIG. 20). Furthermore, the oscillator 106 may be provided exclusively for each of the transmission blocks.

Firstly, the transmission device 100 of the transmission system having the aforementioned structure according to the present embodiment will be described.

To the differential encoding section 101, transmission data 120, having an input bit sequence converted by a serial parallel conversion into a sequence represented using symbols, is inputted. The differential encoding section 101 differentially encodes the transmission data 120, thereby obtaining an in-phase axis signal I and quadrature axis signal Q of each symbol. Specifically, the differential encoding section 101 calculates the in-phase axis signal $I_k$ and quadrature axis signal $Q_k$ of a k-th symbol (k is an integer greater than or equal to 0) in accordance with the following formula (2) by using the in-phase axis signal $I_{k-M}$ and quadrature axis signal $Q_{k-M}$ of a k-M-th symbol (M is an integer greater than or equal to 1) which indicates a symbol preceding the k-th symbol by M symbols. Note that $\Delta\theta_k$ represents a phase rotation amount.

$$\begin{cases} I_k = I_{k-M} \cdot \cos\Delta\theta_k - Q_{k-M} \cdot \sin\Delta\theta_k \\ Q_k = I_{k-M} \cdot \sin\Delta\theta_k - Q_{k-M} \cdot \cos\Delta\theta_k \end{cases} \quad (2)$$

Figure 2:
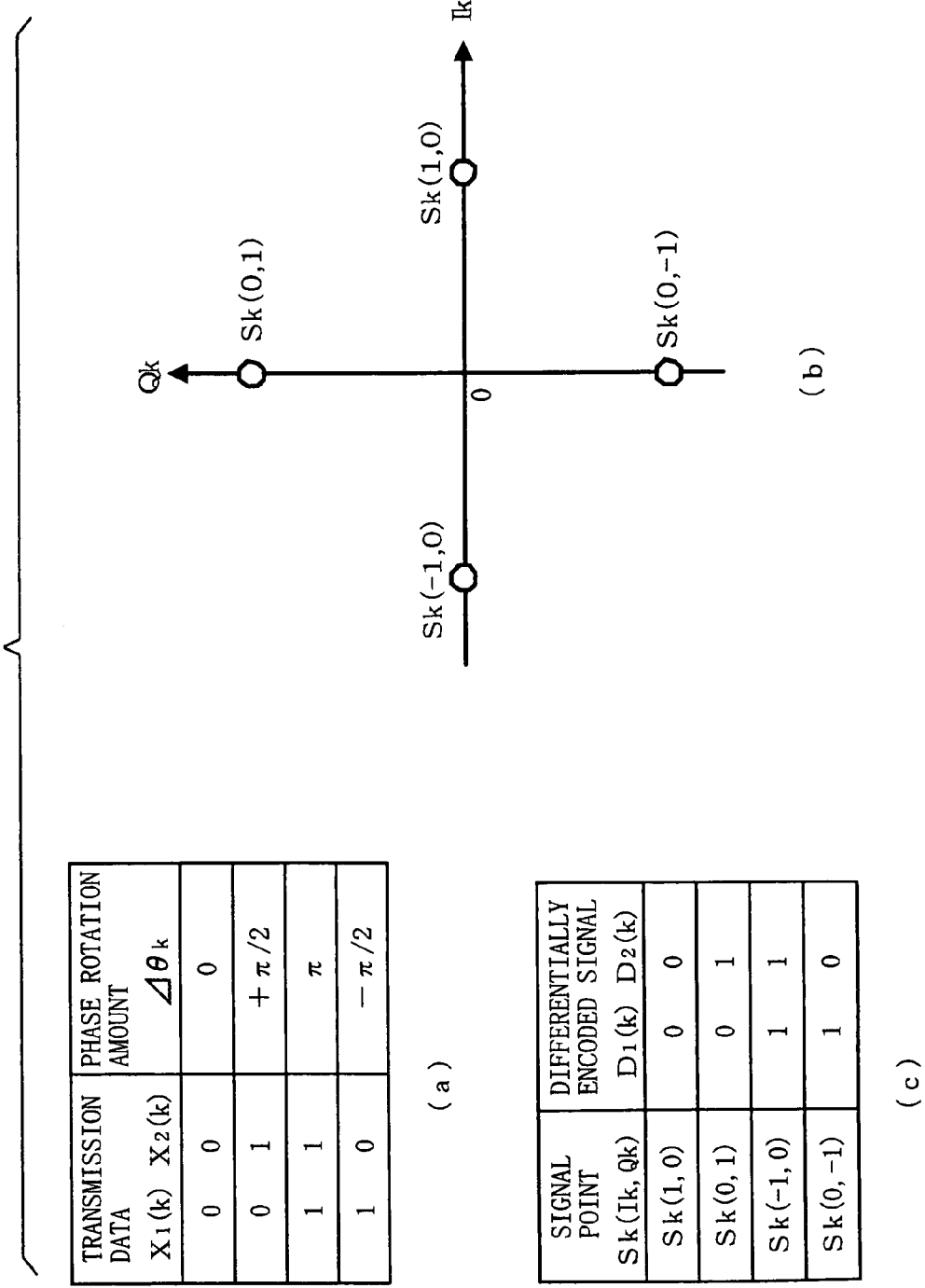
FIG. 2 is a diagram illustrating an exemplary differential encoding rule and a signal space diagram in the transmission system according to the embodiment of the present invention.

FIG. 2 is a diagram illustrating an exemplary differential encoding rule and a signal space diagram in the transmission system according to the embodiment of the present invention. Firstly, phase rotation amounts $\Delta\theta_k$ of continuous two pieces of data (represented using symbols) $X_1(k)$ and $X_2(k)$ having two bits, which are included in the transmission data 120 are determined in accordance with (a) of FIG. 2. Next, a signal diagram of a signal point $S_k(I_k, Q_k)$ of the k-th symbol is determined by the formula (2) only if an initial value $S_0(I_0, Q_0)$ is determined. This can be shown as (b) of FIG. 2. Then, based on signal points $S_k(1,0), S_k(0,1), S_k(-1,0)$ and $S_k(0,-1)$, which are shown in (b) of FIG. 2, a differential encoded signal $(D_1(k), D_2(k))$ is obtained in accordance with (c) of FIG. 2.

The first waveform generation section 102 stores a predetermined first symbol waveform, and outputs baseband modulated signals 122 and 123 in accordance with a differential encoded signal 121 outputted from the differential encoding section 101. The second waveform generation section 103 stores a predetermined second symbol waveform, and outputs baseband modulated signals 124 and 125 in accordance with the differential encoded signal 121 outputted from the differential encoding section 101. The first symbol waveform and the second symbol waveform are different from each other, and phase transitions of the baseband modulated signals 122 and 123 are different from those of the baseband modulated signals 124 and 125.

Figure 3:
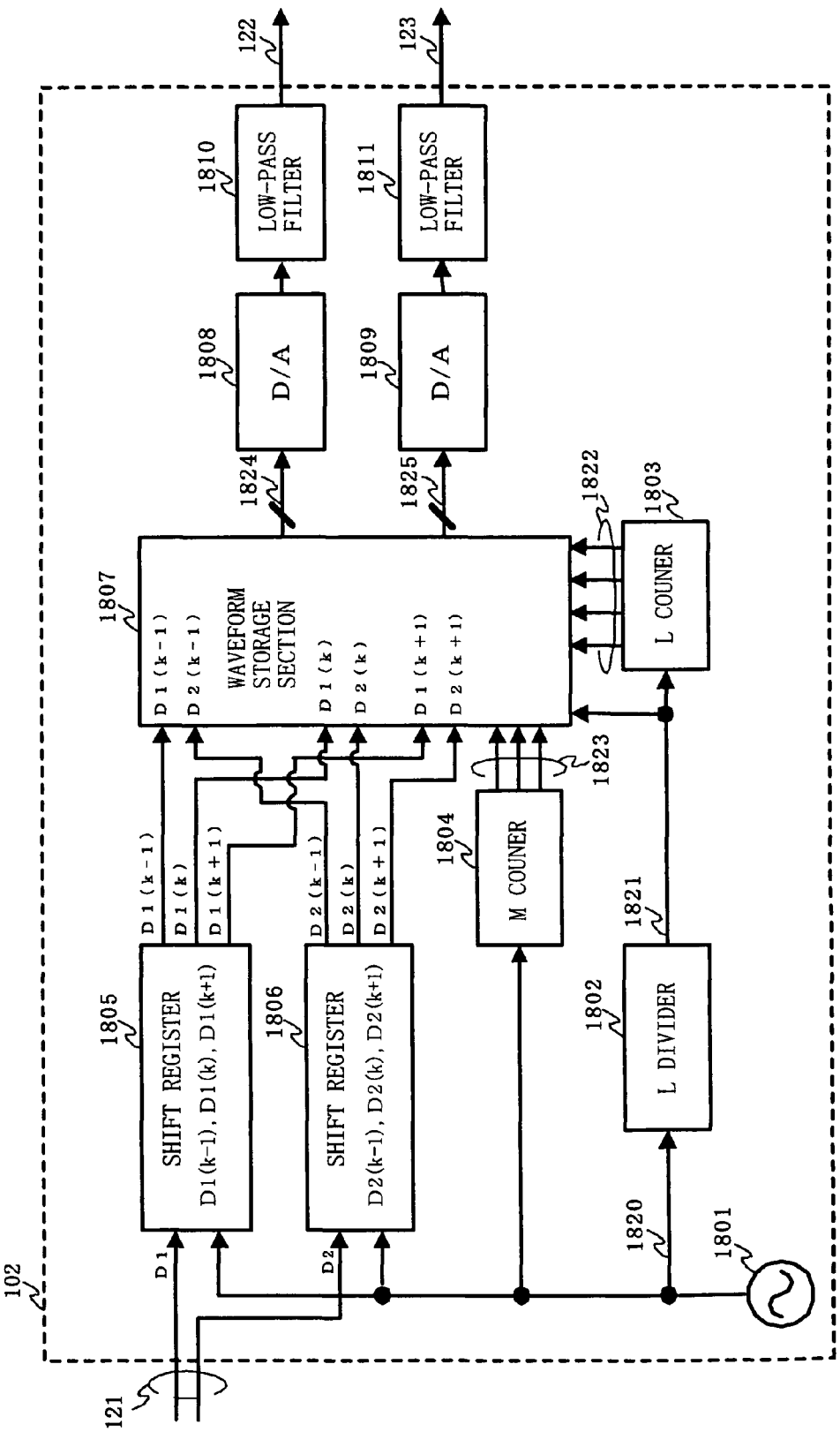
FIG. 3 is a diagram illustrating an exemplary structure of a first waveform generation section 102.

FIG. 3 is a diagram illustrating an exemplary structure of the first waveform generation section 102. In FIG. 3, the first waveform generation section 102 includes a clock oscillator 1801, an L divider 1802, an L counter 1803, an M counter 1804, shift registers 1805 and 1806, a waveform storage section 1807, D/A converters 1808 and 1809, and low-pass filters 1810 and 1811. Note that the second waveform generation section 103 has the same structure as the first waveform generation section 102 and the description thereof will be omitted.

Figure 4:
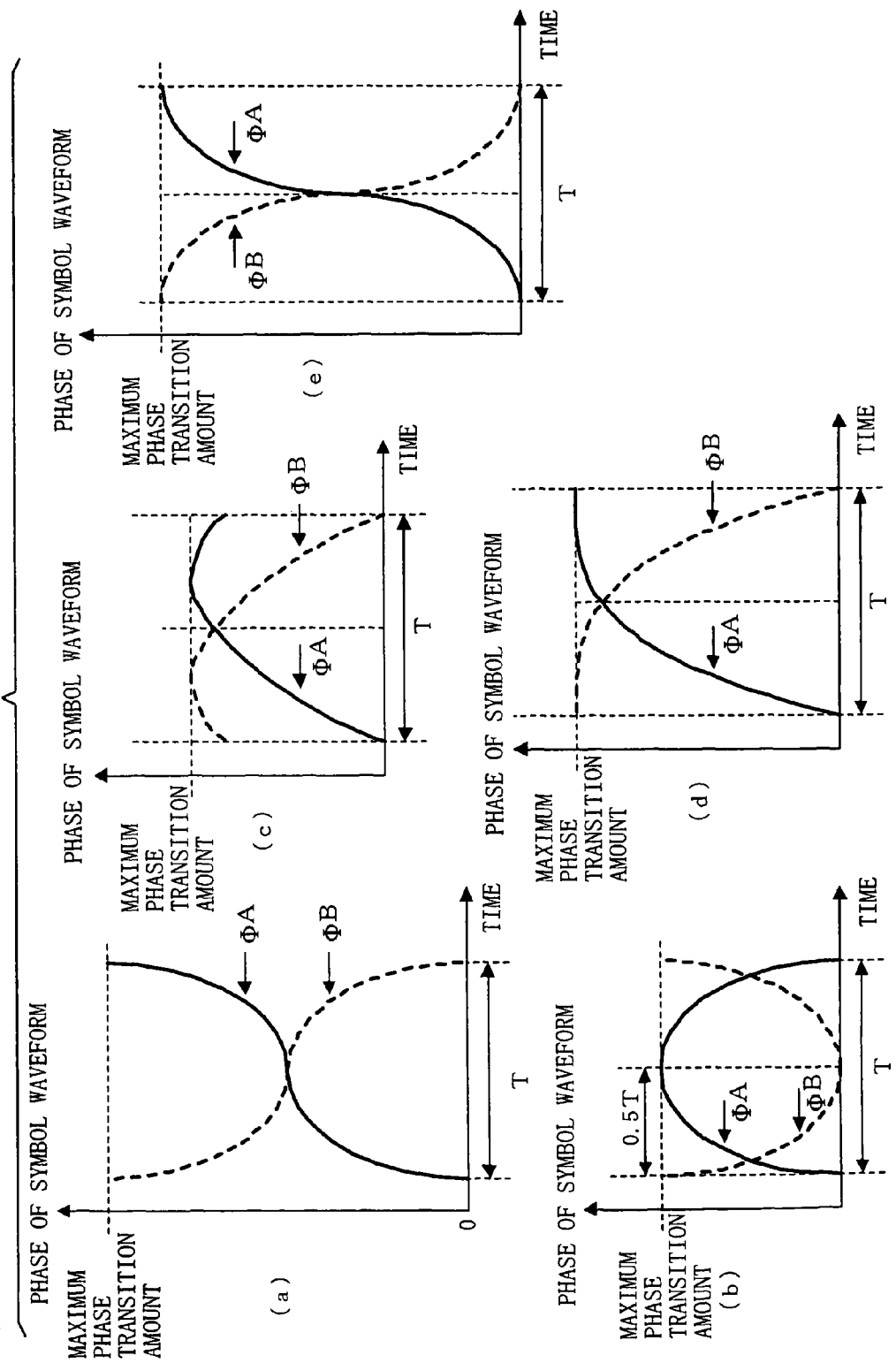
FIG. 4 shows examples of phase transitions, each comprised of symbol waveforms, stored in the first waveform generation section 102 and a second waveform generation section 103.

FIG. 4 shows various examples of phase transitions, each comprised of first and second symbol waveforms, from which the baseband modulated signals 122 to 125 generated by the first waveform generation section 102 and the second waveform generation section 103 are to be made. A condition required for the first and second symbol waveforms is that a second-order differential coefficient representing an amount of change is not always "0" during a symbol. For example, this applies to a case, as shown in (a) of FIG. 4, where the first symbol waveform has a phase transition shown by a solid line and the second symbol waveform has a phase transition shown by a dotted line. Note that (a) to (e) of FIG. 4 are merely examples of the phase transitions. The phase transitions may be different if the aforementioned condition is satisfied. Furthermore, the phase transition of the first symbol waveform and the phase transition of the second symbol waveform do not have to be symmetrical with each other. The phase transitions of the first and second symbol waveforms may be all types of combinations of solid and dotted lines, or any combination of solid lines only or dotted lines only, which are all shown in (a) to (e) of FIG. 4.

Furthermore, a maximum of M types of symbol waveforms can be used for one transmission block. The same type of symbol waveform may be repeatedly included in the M types of symbol waveforms. In a case of M=1, one type of symbol waveform is used for each transmission block. Note that during a symbol, when symbol waveforms corresponding to the same transmission data are used among different transmission blocks, the symbol waveforms have to be different from each other for each of the transmission blocks.

During a symbol corresponding to a symbol length T (0<t<T), when a combination of the waveforms as shown in (a) of FIG. 4 is selected, a phase transition $\Phi^A_m(t)$ of an m-th (1≦m≦M) symbol waveform of the baseband modulated signal generated by the first waveform generation section 102, and a phase transition $\Phi^B_m(t)$ of the m-th symbol waveform of the baseband modulated signal generated by the second waveform generation section 103 are represented by the following formulas (3) and (4), for example.

$$\Phi^A_m(t) = \begin{cases} (2\phi_{MAX}/T^2) \cdot t \cdot (T-t); & (0 < t \leq T/2) \\ -(2\phi_{MAX}/T^2) \cdot t \cdot (T-t) + \phi_{MAX}; & (T/2 < t < T) \end{cases} \quad (3)$$

$$\Phi^B_m(t) = \begin{cases} -(2\phi_{MAX}/T^2) \cdot t \cdot (T-t) + \phi_{MAX}; & (0 < t \leq T/2) \\ (2\phi_{MAX}/T^2) \cdot t \cdot (T-t); & (T/2 < t < T) \end{cases} \quad (4)$$

When a phase of a signal point, shown in (b) of FIG. 2, of a q-th symbol (q is an integer) is denoted by $\theta_q$, a phase $\theta(t)$ representing transmission data which has been differentially encoded is represented by the following formula (5) using a step function U(t).

$$\theta(t) = \sum_{q=-\infty}^{\infty} \theta_q \cdot \{U(t - qT) - U(t - (q-1)T)\} \quad (5)$$

where $$U(t) \equiv \begin{cases} 1; & (t \geq 0) \\ 0; & (t < 0) \end{cases}$$

When the phase transition $\Phi^A_m(t)$ is defined only within 0<t<T, and is 0 within sections other than 0<t<T, a phase transition $\Psi^A(t)$ of the baseband modulated signal is represented by the following formula (6).

$$\psi^A(t) = \sum_{p=-\infty}^{\infty} \sum_{m=1}^{M} \Phi^A_m(t - (pM + m - 1)T) + \theta(t) \quad (6)$$

where $$\Phi^A_m(t) \equiv 0; \quad (t \leq 0, t \geq T)$$

Thus, based on the phase transition $\Psi^A(t)$ of the baseband modulated signal, an in-phase modulated signal $Y^A_I(t)$ and a quadrature modulated signal $Y^A_Q(t)$ are represented by the following formula (7).

$$\begin{cases} Y^{(A)}_I(t) = \cos\psi^A(t) \\ Y^A_Q(t) = \sin\psi^A(t) \end{cases} \quad (7)$$

Basically, quadrature modulation is performed on a carrier wave by these signals, thereby obtaining an RF-band modulated signal. Since the RF-band modulated signal thus obtained is a wideband signal, the band of the signal may be limited by using a band limiting filter. In this case, when an impulse response of the band limiting filter is denoted by h(t), the in-phase modulated signal $Y^A_I(t)$ and quadrature modulated signal $Y^A_Q(t)$ obtained after the bands thereof are limited are represented by not the aforementioned formula (7) but the following formula (8).

$$\begin{cases} Y^A_I(t) = \int_{-t_0}^{+t_0} \cos\psi^A(t - \tau) \cdot h(\tau) d\tau \\ Y^A_Q(t) = \int_{-t_0}^{+t_0} \sin\psi^A(t - \tau) \cdot h(\tau) d\tau \end{cases} \quad (8)$$

Similarly, based on the phase transition $\Phi^B_m(t)$ of the symbol waveform shown in (a) of FIG. 4, a phase transition $\Psi^B(t)$ of the baseband modulated signal generated by the second waveform generation section 103 is also represented by the following formula (9).

$$\psi^B(t) = \sum_{p=-\infty}^{\infty} \sum_{m=1}^{M} \Phi^B_m(t - (pM + m - 1)T) + \theta(t) \quad (9)$$

where $$\Phi^B_m(t) \equiv 0; \quad (t \leq 0, t \geq T)$$

The in-phase modulated signal $Y^A_I(t)$ and the quadrature modulated signal $Y^A_Q(t)$ are represented by the following formula (10).

$$\begin{cases} Y^B_I(t) = \int_{-t_0}^{+t_0} \cos\psi^B(t - \tau) \cdot h(\tau) d\tau \\ Y^B_Q(t) = \int_{-t_0}^{+t_0} \sin\psi^B(t - \tau) \cdot h(\tau) d\tau \end{cases} \quad (10)$$

Note that an integration range $-t_0$ to $t_0$ of each of the aforementioned formulas (8) and (10) indicates a range of the spread of the impulse response h(t). Further, the band limiting filter may be a low-pass filter, and various characteristics (cosine roll-off, root Nyquist, Gauss, etc.) and parameters (cut-off rate, roll-off rate, etc.) can be used. In the present embodiment, the impulse response h(t) of a cosine roll-off filter having a cut-off angular frequency $\omega_0$ and a roll-off coefficient $\gamma$, for example, is represented by the following formula (11).

$$h(t) = \frac{(\omega_0/\pi) \cdot (\sin\omega_0 t / \omega_0 t)\cos\gamma\omega_0 t}{1 - (2\gamma\omega_0 t/\pi)^2} \quad (11)$$

The waveform storage section 1807 stores the in-phase modulated signal $Y^A_I(t)$ and the quadrature modulated signal $Y^A_Q(t)$ in accordance with the aforementioned formula (8). In the first waveform generation section 102 shown in FIG. 3, the range $-t_0$ to $t_0$ of the spread of the impulse response h(t) corresponds symbols including a current symbol and symbols immediately preceding and following the current symbol, for example. In this case, in the waveform storage section 1807, all patterns of transmission data are calculated for the current symbol and the symbols immediately preceding and following the current symbol, and elements of the modulated signals of each of the symbols are stored. The inputted differential encoded signal 121 is delayed by the shift registers 1805 and 1806, so as to be inputted to the waveform storage section 1807 as signals from a k−1-th symbol to a k+1-th symbol, which are selected from the elements of the modulated signals centering on the k-th symbol.

The clock oscillator 1801 oscillates a clock signal having a symbol frequency Fs, and the clock signal is inputted to each of the shift registers 1805 and 1806 as an operation clock. The M counter 1804 operates at the symbol frequency Fs, and inputs M different waveform selection signals 1823 to the waveform storage section 1807. Thus, the waveform storage section 1807 can select a plurality of different symbol waveforms for each period corresponding to M symbols. The waveform storage section 1807 is a memory storing a waveform table including the elements of the modulated signals of each symbol, and the elements of the modulated signals of each symbol stored therein have L samples. By using a clock having a frequency L·Fs outputted from the L divider as a read clock and counter signals 1822 as a read address, a signal point of each symbol is sequentially read. The signals of two axes are converted, by the D/A converters 1808 and 1809, respectively, into signals represented by analog values. Then, aliasing components of the converted signals are removed by the low-pass filters 1810 and 1811 so as to be outputted as the in-phase modulated signal 122 and the quadrature modulated signal 123, respectively. Although the second waveform generation section 103 stores waveforms different from those stored in the first waveform generation section 102, a structure and operation of the second waveform generation section 103 are completely the same as that of the first waveform generation section 102.

As represented by the aforementioned formula (7), when the band of the signal is not limited, it is unnecessary to have the shift registers 1805 and 1806. In this case, the differential encoded signal 121 is directly inputted to the waveform storage section 1807. Further, when a signal is differentially encoded so as to be delayed by one symbol (M=1), or when one type of symbol waveform is used, the M counter 1804 is unnecessary.

Figure 5:
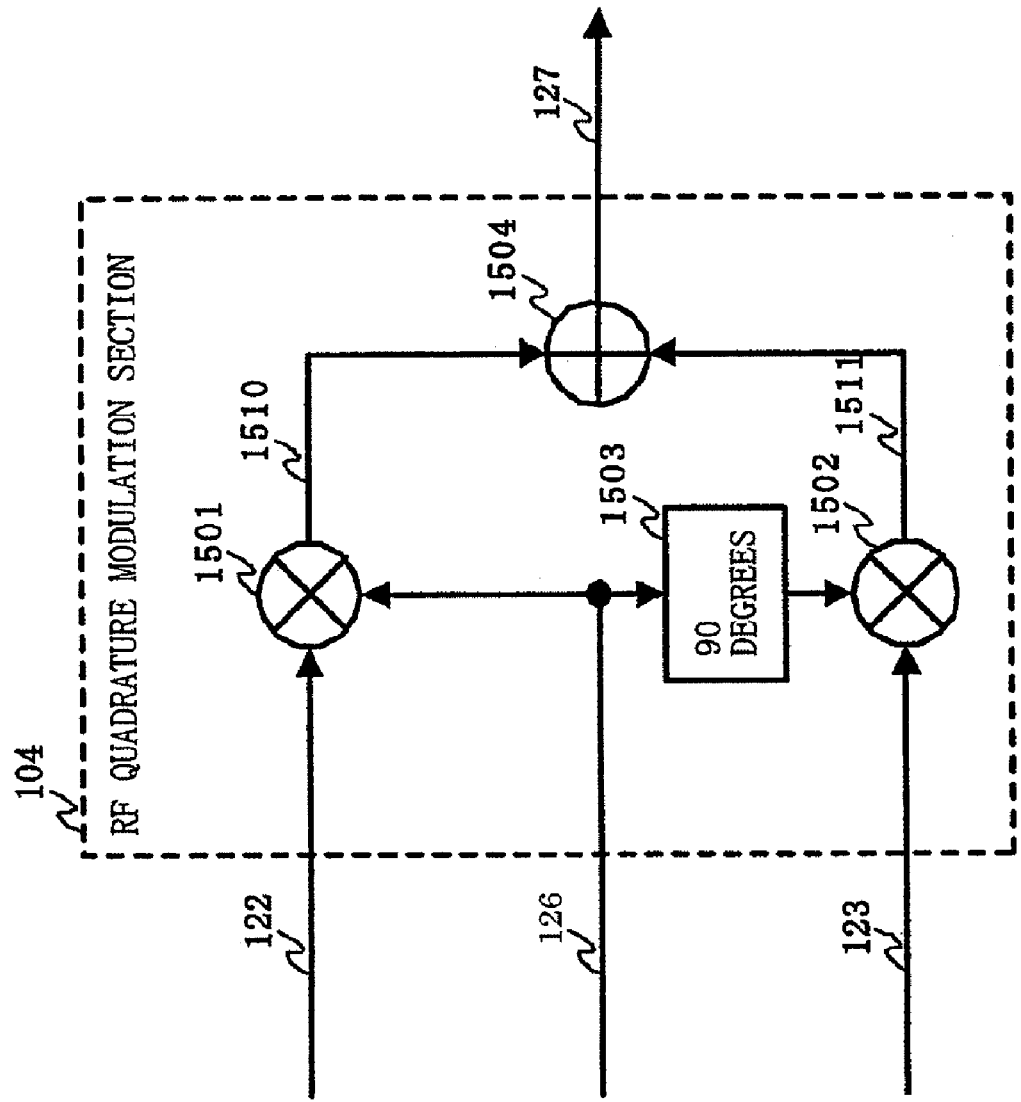
FIG. 5 is a diagram illustrating a detailed structure of an RF quadrature modulation sections 104 or 105.

The RF quadrature modulation section 104 modulates a carrier wave signal 126 by using the modulated signals outputted from the first waveform generation section 102, thereby generating an RF-band modulated signal 127. Also, the RF quadrature modulation section 105 modulates the carrier wave signal 126 by using the modulated signals outputted from the second waveform generation section 103, thereby generating an RF-band modulated signal 128. FIG. 5 is a diagram illustrating a detailed structure of each of the RF quadrature modulation sections 104 and 105.

In FIG. 5, each of the RF quadrature modulation sections 104 and 105 includes a 90-degree phase shifter 1503, balanced modulators 1501 and 1502, and a synthesizer 1504. The RF quadrature modulation section 104 causes the balanced modulator 1501 to modulate the carrier wave signal 126 supplied from the oscillator 106 by using the in-phase modulated signal 122 outputted from the first waveform generation section 102, thereby obtaining a to-be-modulated in-phase signal 1510. Also, the RF quadrature modulation section 104 causes the 90-degree phase shifter 1503 to shift the carrier wave signal 126 by 90 degrees, and causes the balanced modulator 1502 to modulate the shifted signal by using the quadrature modulated signal 123 outputted from the first waveform generation section 102, thereby obtaining a to-be-modulated quadrature signal 1511. Thereafter, the RF quadrature modulation section 104 causes the synthesizer 1504 to combine the to-be-modulated quadrature signal 1511 with the to-be-modulated in-phase signal 1510, thereby generating the RF-band modulated signal 127. Similarly, the RF quadrature modulation section 105 causes the second waveform generation section 103 to generate the RF-band modulated signal 128.

The RF-band modulated signals 127 and 128 generated by the RF quadrature modulation sections 104 and 105 are amplified by the amplifiers 107 and 108 so as to be transmitted through the transmission antennas 109 and 110, respectively.

Next, the reception device 140 of the transmission system having the aforementioned structure according to the present embodiment will be described with reference to FIG. 1.

A plurality of transmission signals transmitted from the transmission device 100 are received by the reception antenna 141, and inputted to the amplifier 142 as an RF-band reception signal 150. The amplifier 142 amplifies the received RF-band reception signal 150. The RF section 143 converts the RF-band reception signal 150 having an RF-band frequency, which is amplified by the amplifier 142, into a signal having a baseband frequency. The delay detection section 144 performs delay detection on the converted reception signal 151 having the baseband frequency along two axes orthogonal to each other, thereby obtaining a detection signal 152. The data determination section 145 determines the detection signal 152 outputted from the delay detection section 144, so as to output received data 153 having two bits per symbol.

Figure 6:
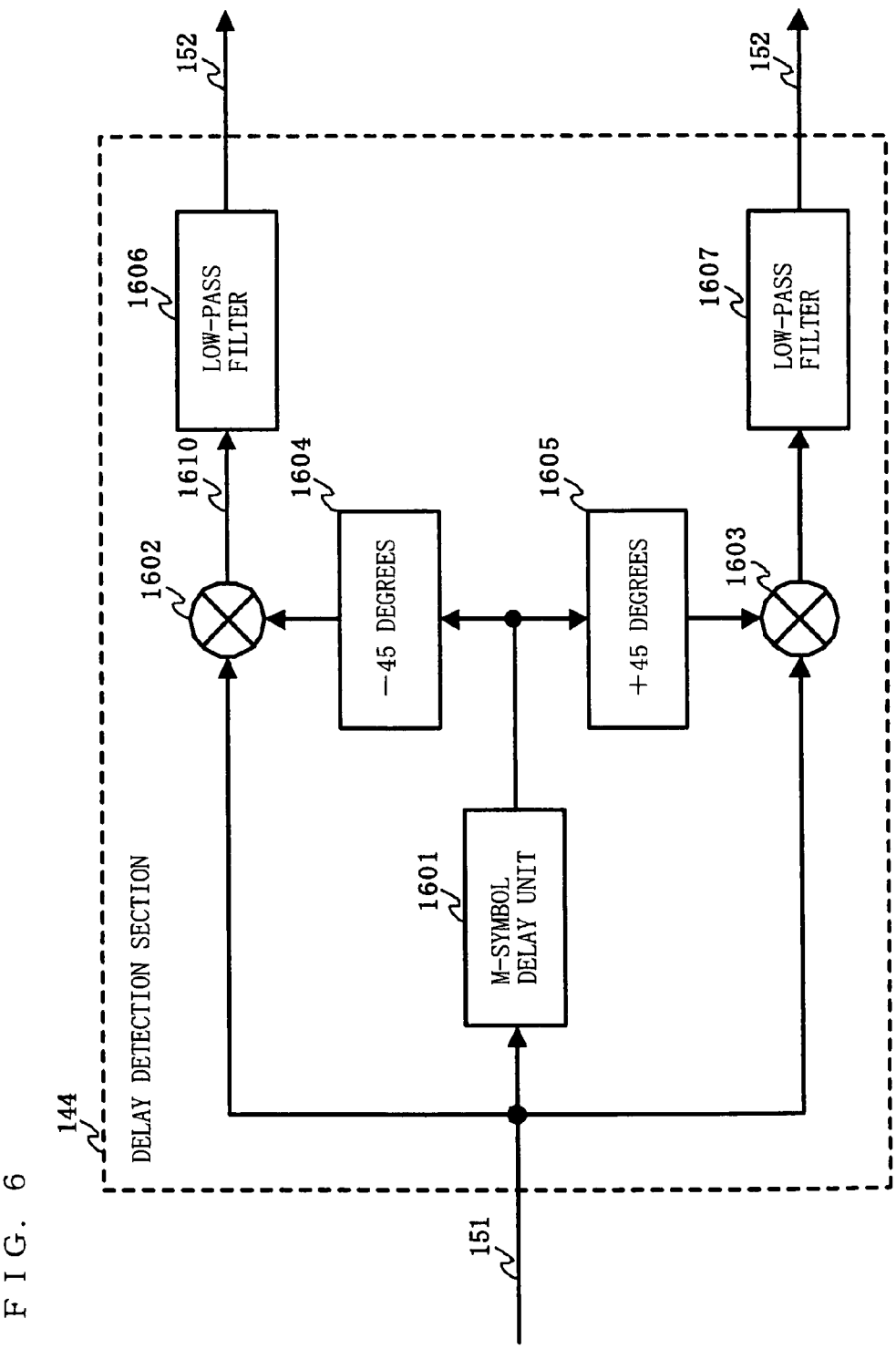
FIG. 6 is a diagram illustrating a detailed structure of a delay detection section 144.

FIG. 6 is a diagram illustrating a detailed structure of the delay detection section 144. In FIG. 6, the delay detection section 144 includes an M-symbol delay unit 1601, multipliers 1602 and 1603, a minus 45-degree phase shifter 1604, a plus 45-degree phase shifter 1605, and low-pass filters 1606 and 1607. The M-symbol delay unit 1601 delays the reception signal by an M-symbol length. Note that a carrier wave to be inputted and the carrier wave to be outputted are in phase with each other. The low-pass filters 1606 and 1607 are operable not only to remove a frequency component twice as high as that of a carrier wave generated by each of the multipliers 1602 and 1603, but also to combine a plurality of detection outputs with each other, which is to be described later. In FIG. 6, the delay detection section 144 processes the reception signal 151 whose frequency is converted by the RF section 143 preceding the delay detection section 144 into a baseband frequency. However, the delay detection section 144 may process the RF-band received signal 150 directly inputted thereto.

Next, the principle in which a diversity effect is achieved by the transmission method used in the transmission system having the aforementioned structure according to the present embodiment will be described in detail, mainly with respect to the first and second symbol waveforms from which the baseband modulated signals are to be generated.

Firstly, a case where delay dispersion in a propagation path can be ignored will be described. Specifically, in the aforementioned case, although a multipath (multipath propagation) is caused in each propagation path through which a signal is transmitted from each of the transmission antennas 109 and 110, a delay between multipath waves relative to the symbol length can be ignored. This applies to the case where the incoming signal A and the incoming signal B are individually subjected to Rayleigh variation, and is called a flat fading in which a propagation path frequency characteristic within a transmission band is uniform. Furthermore, the phase difference $\alpha$ is a parameter which is dependant on a distance relationship between the transmission antenna 109 and the reception antenna 141 and between the transmission antenna 110 and the reception antenna 141.

Figure 7:
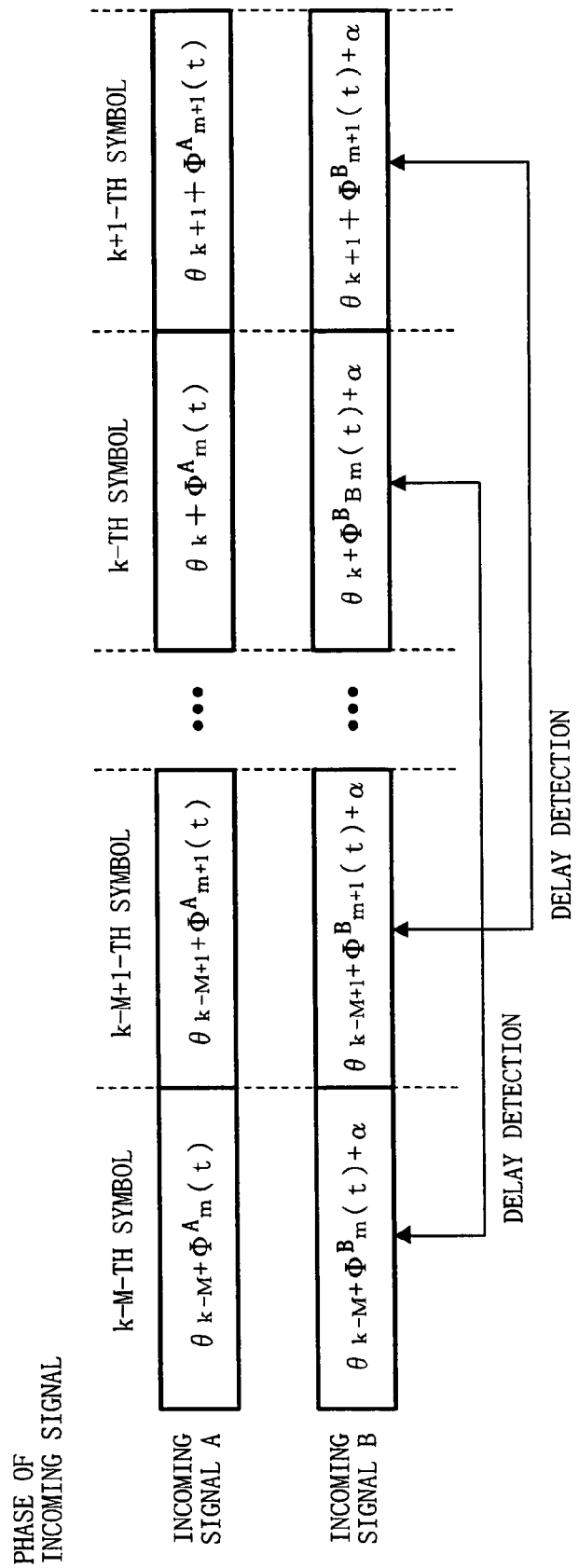
FIG. 7 is a schematic diagram illustrating phases of transmission signals A and B transmitted from transmission antennas 109 and 110, which change on a symbol-by-symbol basis.

FIG. 7 is a schematic diagram illustrating phases of the transmission/incoming signals A and B transmitted from the transmission antennas 109 and 110 and then received by the reception antenna 141, which change on a symbol-by-symbol basis. FIG. 7 shows phases of a k-M-th symbol, a k-M+1-th symbol, a k-th symbol, and a k+1-th symbol. Note that a signal point varied in accordance with the transmission data, a phase transition of an m-th symbol waveform of the transmission signal A and a phase transition of an m-th symbol waveform of the transmission signal B are denoted by $\theta_k$, $\Phi^A_m(t)$ and $\Phi^B_m(t)$, respectively.

As the phase of the incoming signal A, during the k-th symbol, the phase transition $\Phi^A_m(t)$ of the symbol waveform is added to the phase $\theta_k$, an initial point, which is constant during the symbol. Similarly, as the phase of the incoming signal B, during the k-th symbol, the phase transition $\Phi^B_m(t)$ of the symbol waveform is added to a combined phase, as an initial point, obtained by adding the phase relationship $\alpha$ between the incoming signals to the phase $\theta_k$ of the signal point of the k-th symbol. During the k-M-th symbol, which is a symbol preceding the k-th symbol by M symbols, the phase transition $\Phi^A_m(t)$ or $\Phi^B_m(t)$ of the symbol waveform similar to that of the k-th symbol is added to a phase $\theta_{k-M}$, an initial point, of the signal point. Then, the delay detection section 144 performs delay detection for the k-th symbol and the k-M-th symbol.

Figure 8:
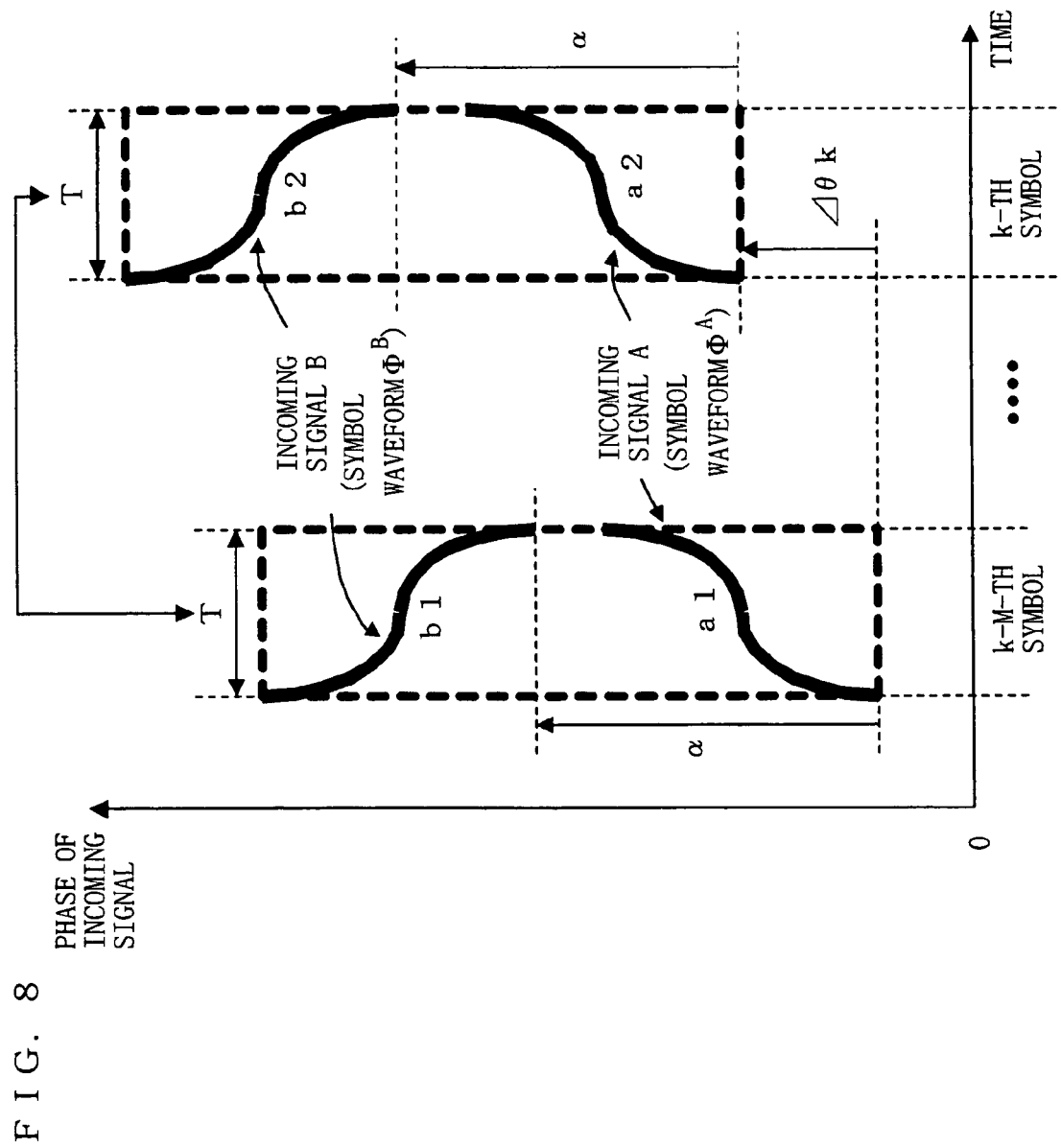
FIG. 8 is a schematic phase transition diagram illustrating a phase relationship between an incoming signal A and an incoming signal B and a phase relationship between different symbols.

FIG. 8 is a schematic phase transition diagram illustrating a phase relationship between the incoming signal A and the incoming signal B and a phase relationship between different symbols. Note that in this example, it is assumed that the phases of the symbol waveforms of the transmission signal A (incoming signal A) and the transmission signal B (incoming signal B) change as shown in (a) of FIG. 4.

In FIG. 8, the phase of the incoming signal A changes during the k-M-th symbol as shown by a phase transitional, and the phase of the incoming signal B changes during the k-M-th symbol, as shown by a phase transition b1, from a phase point shifted from an initial point of the phase transitional by the phase difference $\alpha$. Then, during the k-th symbol, the phase of the incoming signal A changes, as shown by a phase transition a2, from a phase point shifted from the initial point of the phase transitional of the k-M-th symbol by a phase $\Delta\theta_k$ caused by the differential encoding, and the phase of the incoming signal B changes, as shown by a phase transition b2, from a phase point shifted from an initial point of the phase transition a2 by the phase difference $\alpha$. Therefore, by shifting the phases of the k-M-th symbol by the phase $\Delta\theta_k$ caused by the differential encoding, the phase transitions a1 and b1 of the k-M-th symbol become the phase transitions a2 and b2 of the k-th symbol. Thus, the delay detection is performed for the k-M-th symbol based on the k-th symbol, thereby obtaining the phase $\Delta\theta_k$ caused by the differential encoding. As a result, the data can be demodulated.

Furthermore, the phase relationship between the incoming signal A and the incoming signal B will be described with reference to a vector diagram.

Figure 9:
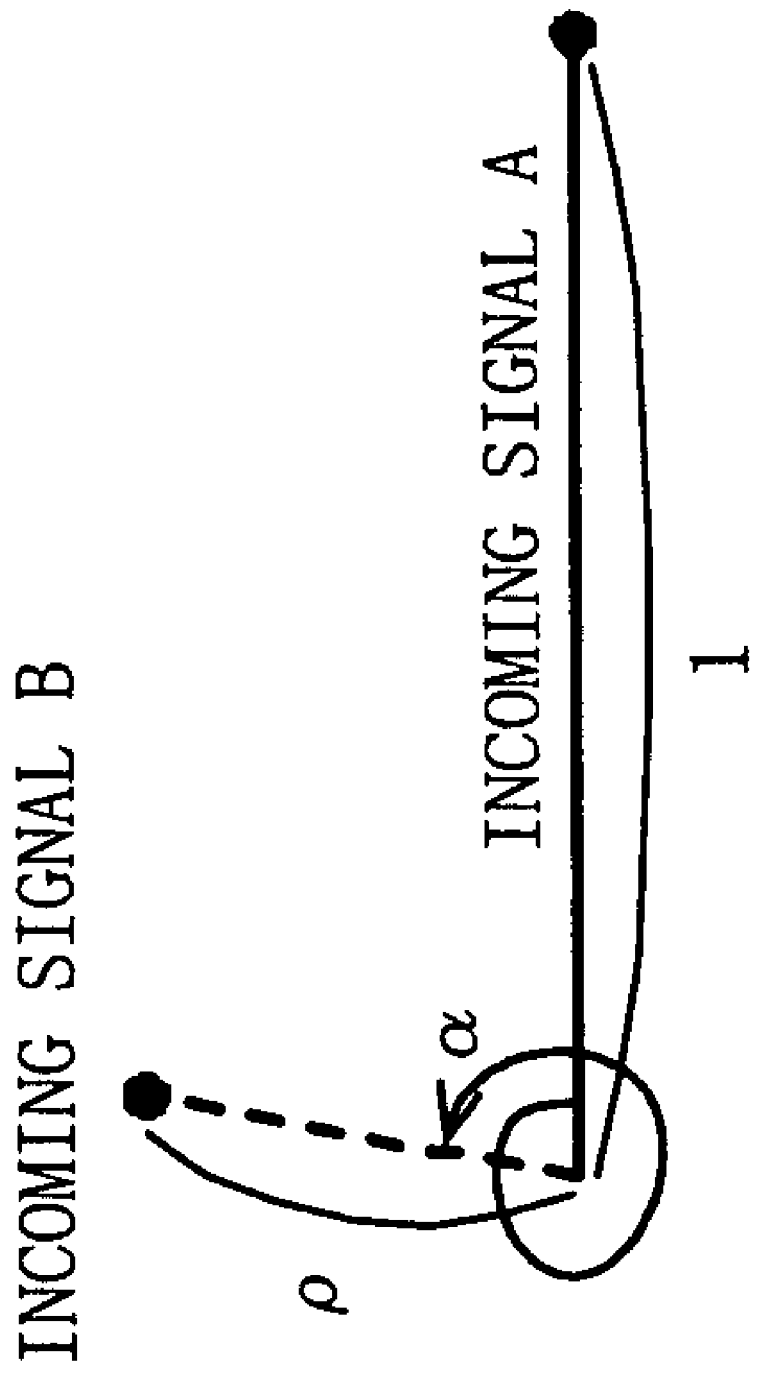
FIG. 9 is a diagram illustrating the phase relationship, represented by vectors, between the incoming signal A and the incoming signal B.

As shown in FIG. 9, it is assumed that a signal level of the incoming signal A, a signal level of the incoming signal B and the phase difference between the incoming signals are denoted by 1, $\rho$ and $\alpha$, respectively.

Figure 10:
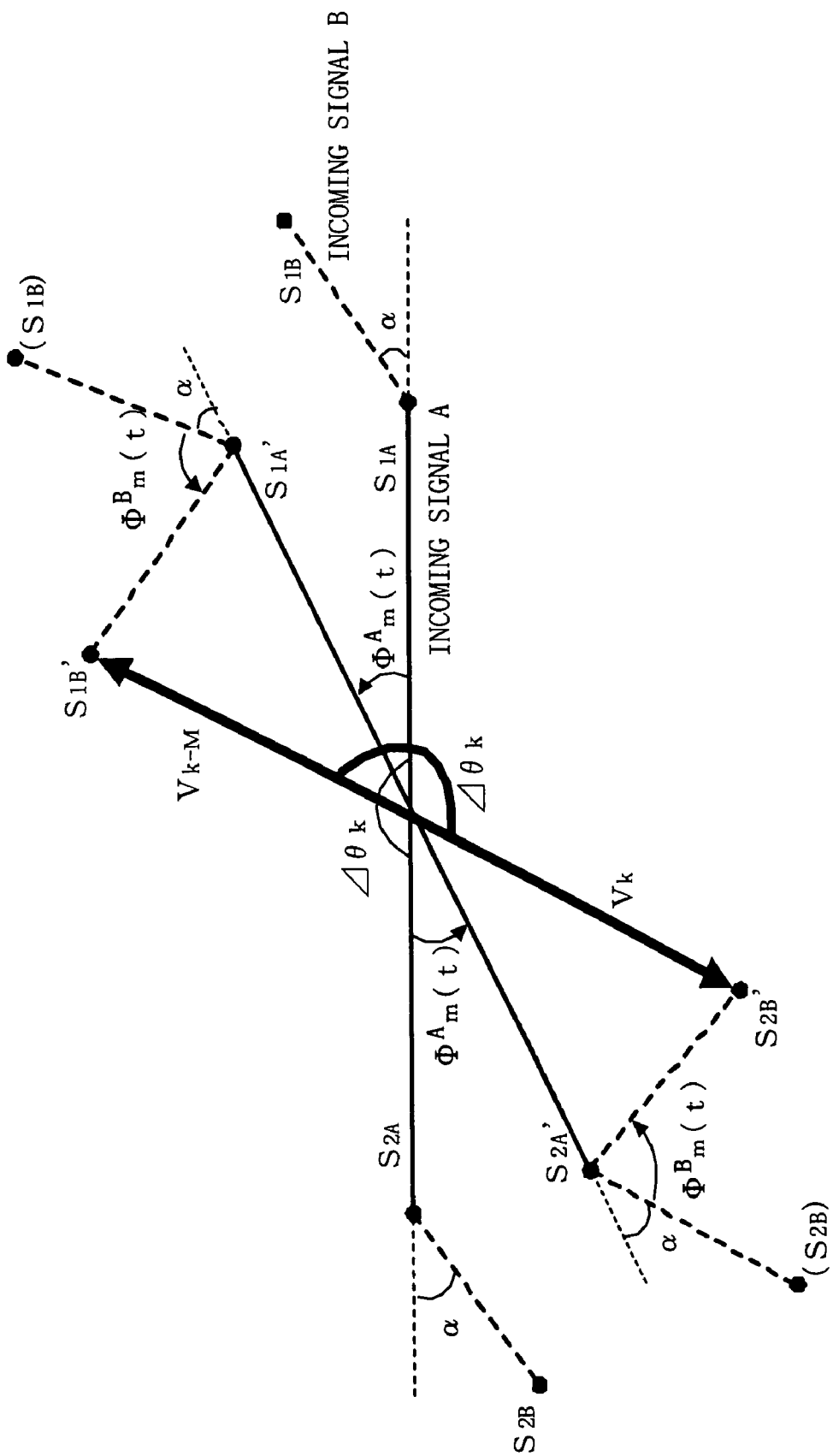
FIG. 10 is a diagram illustrating of phase transitions, each being represented by vectors, of the incoming signal A and the incoming signal B.

In this case, as shown in FIG. 10, during the k-M-th symbol, a vector $S_{1B}$ representing the incoming signal B is different from a vector $S_{1A}$ representing the incoming signal A by the phase difference $\alpha$. The phase of the incoming signal A changes in accordance with $\Phi^A_m(t)$ from the vector $S_{1A}$ as time elapses, and it is assumed that the incoming signal A is represented by a vector $S_{1A}'$ at an arbitrary time t. The phase of the incoming signal B changes in accordance with $\Phi^B_m(t)$ from the vector $S_{1B}$ as time elapses, and it is assumed that the incoming signal B is represented by a vector $S_{1B}'$ at the time t. In this case, a vector representing a received wave at the time t is denoted by $V_{k-M}$.

Similarly, during the k-th symbol, a vector $S_{2A}$ representing the incoming signal A is different from the vector $S_{1A}$ by $\Delta\theta_k$ (in a case where the phase difference $\Delta\theta_k$ between symbols for which the delay detection is performed is $\pi$), and a vector $S_{2B}$ representing the incoming signal B is different from the vector $S_{2A}$ representing the incoming signal A by $\alpha$. The phase of the incoming signal A changes in accordance with $\Phi^A_m(t)$ from the vector $S_{2A}$ as time elapses, and it is assumed that the incoming signal A is represented by a vector $S_{2A}'$ at the arbitrary time t. The phase of the incoming signal B changes in accordance with $\Phi^B_m(t)$ from the vector $S_{2B}$ as time elapses, and it is assumed that the incoming signal B is represented by a vector $S_{2B}'$ at the arbitrary time t. In this case, a vector representing a received wave at the time t is denoted by $V_k$.

As described above, the phase of the incoming signal A and the phase of the incoming signal B change in a similar manner during each of the k-M-th symbol and the k-th symbol. Thus, a phase difference between the two received waves represented by the vectors $V_k$ and $V_{k-M}$ is always $\Delta\theta_k$ at the arbitrary time t.

Next, a phase transition of a symbol waveform from which a detection output is to be effectively obtained will be described. Based on FIG. 10, when signal points of the k-M-th symbol and the k-th symbol are denoted by $S_{k-m}$ and $S_k$, respectively, the vectors $V_{k-M}(t)$ and $V_k(t)$ representing the received waves at the arbitrary time t are represented by the following formula (12).

$$\begin{cases} V_{k-M}(t) = S_{k-M} \cdot \{e^{j\Phi^A_m(t)} + \rho \cdot e^{j(\Phi^B_m(t)+\alpha)}\} \\ V_k(t) = S_k \cdot \{e^{j\Phi^A_m(t)} + \rho \cdot e^{j(\Phi^B_m(t)+\alpha)}\} \end{cases} \quad (12)$$

Therefore, a detection output $D_k(t)$ obtained by performing the delay detection is represented by the following formula (13). Note that * indicates a complex conjugate.

$$D_k(t) = V_k(t) \cdot V^*_{k-M}(t) \quad (13)$$

Here, when $\Phi^A_m(t)=u$ and $\Phi^B_m(t)+\alpha=v$ are satisfied, the aforementioned formula (12) is represented by the following formula (14).

$$\begin{aligned} D_k(t) &= S_k \cdot S^*_{k-M} \cdot \{\exp(j \cdot u) + \rho \cdot \exp(j \cdot v)\} \cdot \{\exp(j \cdot u) + \\ &\quad \rho \cdot \exp(j \cdot v)\}^* \\ &= |S_k|^2 \cdot \exp(j \cdot \Delta\theta_k) \cdot \{\cos(u) + j \cdot \sin(u) + \rho \cdot \cos(v) + \\ &\quad j \cdot \rho \cdot \sin(v)\} \cdot \{\cos(u) + j \cdot \sin(u) + \rho \cdot \cos(v) + j \cdot \rho \cdot \sin(v)\}^* \\ &= |S_k|^2 \cdot \exp(j \cdot \Delta\theta_k) \cdot \{1 + \rho^2 + 2\rho \cdot \cos(u-v)\} \end{aligned} \quad (14)$$

Therefore, $D_k(t)$ is represented by the following formula (15).

$$D_k(t) = |S_k|^2 \cdot \exp(j \cdot \Delta\theta_k) \cdot \{1+\rho^2+2\rho \cdot \cos(\Phi^A_m(t)-\Phi^B_m(t)-\alpha)\} \quad (15)$$

In the formula (15), a term including $\exp(j \cdot \Delta\theta_k)$ indicates a detection signal corresponding to the phase $\Delta\theta_k$ for the transmission data, and terms including $|S_k|^2$ and $\{1+\rho^2+2\rho \cdot \cos(\Phi^A_m(t)-\Phi^B_m(t)-\alpha)\}$ never become negative, thereby making it possible to always obtain a correct detection output. The formula (15) becomes zero when a third term, $\{1+\rho^2+2\rho \cdot \cos(\Phi^A_m(t)-\Phi^B_m(t)-\alpha)\}$ becomes zero. However, this is limited to a moment when $\rho=1$ is satisfied and a term of cos becomes $-1$. As long as the phase difference $\Phi^A_m(t)-\Phi^B_m(t)$ between the two symbol waveforms varies in a time interval $0<t<T$, the third term never constantly becomes zero though the third term momentarily becomes zero when ρ and α are arbitrary values. That is to say, the detection output obtained by combining the incoming signal A with the incoming signal B never completely disappears, and thus a diversity effect can be obtained. As a change amount increases, a plurality of effective detection outputs are obtained in the time interval 0<t<T during a symbol, and a higher path diversity effect can be obtained. Preferably, if the change amount is equal to or greater than 2π, the term including $\cos(\Phi^A_m(t)-\Phi^B_m(t)-\alpha)$ always becomes 1, and t at which a maximum detection output is obtained exists in the time interval 0<t<T.

Therefore, if transitional directions of the phases of the first and second symbol waveforms respectively stored in the first waveform generation section 102 and the second waveform generation section 103 included in the transmission device according to the present embodiment are reversed from each other within the same time interval, as the phase transitions $\Phi^A$ and $\Phi^B$ shown in (a) of FIG. 4, a high diversity effect can be obtained at the reception side.

Next, how a detection signal is changed depending on the phase relationship between the incoming signal A and the incoming signal B received by the reception device 140 will be described.

Figure 11:
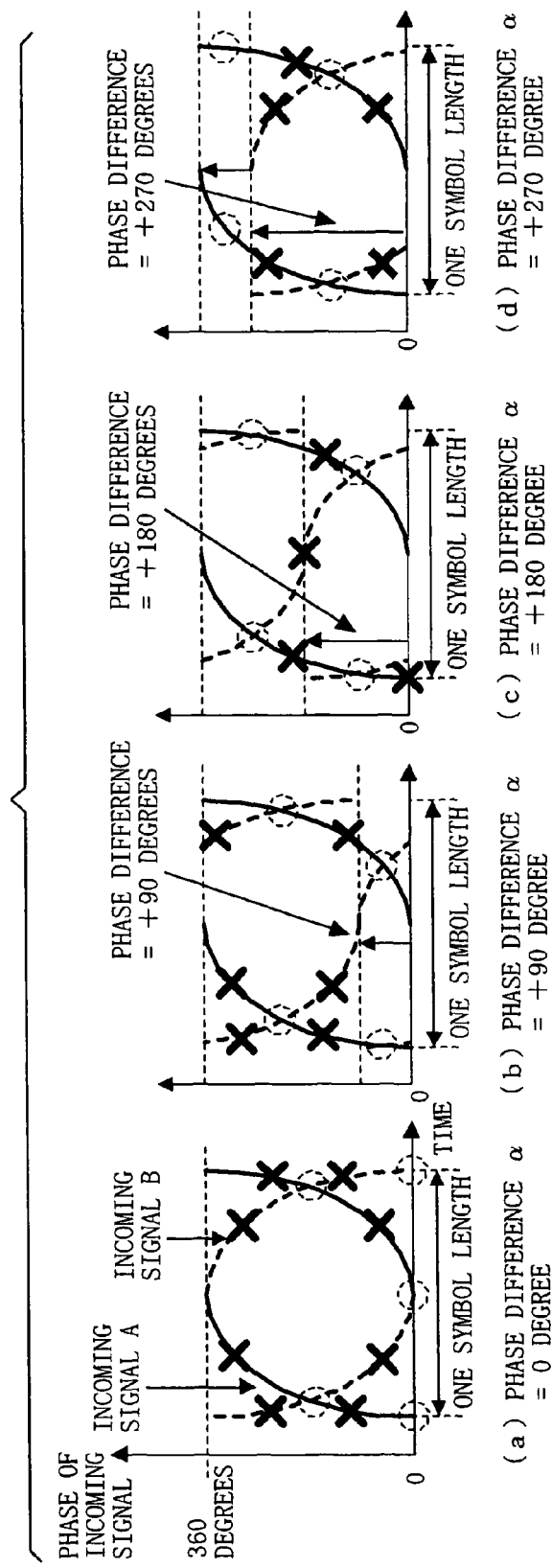
FIG. 11 is a schematic diagram illustrating the phase relationship, obtained when delay dispersion in a propagation path can be ignored, between the incoming signals A and B received by the reception antennas.

FIG. 11 is a schematic diagram illustrating the phase relationship, obtained when the delay dispersion in the propagation path can be ignored, between the incoming signals A and B received by the reception antenna. (a) to (d) of FIG. 11 represent the phase relationships between the symbol waveforms of the incoming signals A and B obtained when α is 0 degree, when α is 90 degrees, when α is 180 degrees and when α is 270 degrees, respectively. In FIG. 11, the vertical axis represents the phases of the k-th symbol, as shown in FIG. 8, within a range of 0 to 360 degrees based on the initial point, of the phase transition a2 of the incoming signal A, which is represented by 0 degree, when $\phi_{MAX}=720$ degrees is satisfied in the aforementioned formulas (3) and (4). Further, a reversed phase point at which the incoming signal A and the incoming signal B have opposite phases is represented by a mark x, and an in-phase point at which the incoming signal A and the incoming signal B are in phase with each other is represented by a mark ○.

Figure 12:
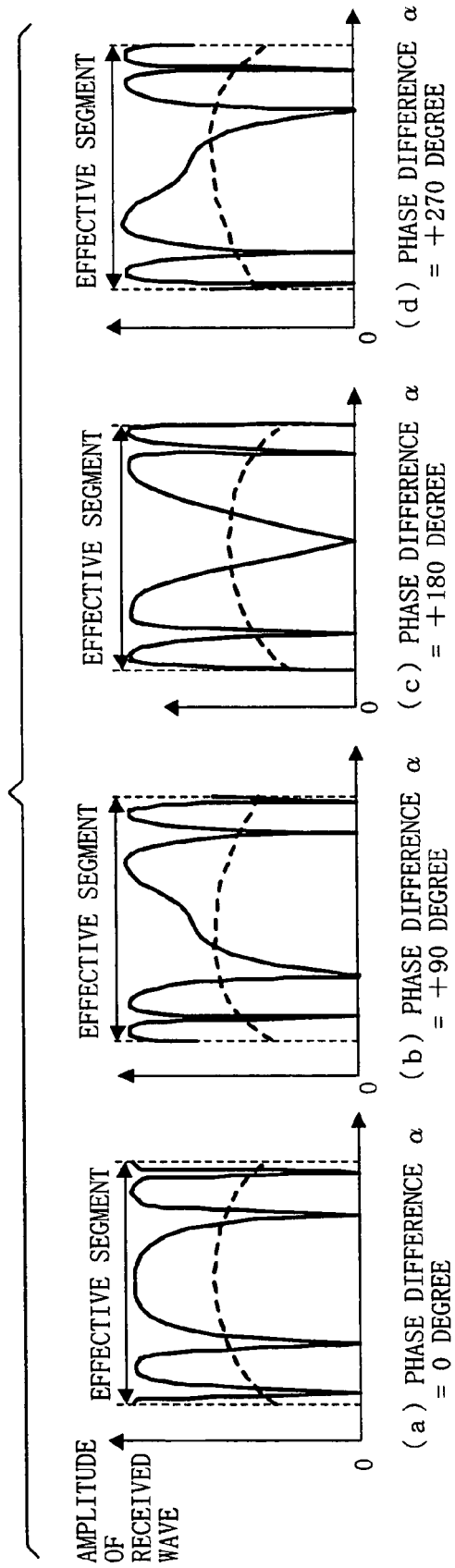
FIG. 12 shows a detection output, generated by the incoming signals A and B, after being passed through low-pass filters 1810 and 1811.

As shown in (a) of FIG. 11, when there is no delay in the propagation path, the reversed phase points, at which the incoming signal A and the incoming signal B cancel each other out and an amplitude of the received wave obtained by combining two vectors representing the incoming signals A and B becomes zero, correspond to an extremely brief moment during one symbol, regardless of the value of α. Therefore, the delay detection is performed on the incoming signals A and B so as to obtain detection amplitudes having shapes substantially similar to each other, each detection amplitude being proportional to the square of the received wave. These detection amplitudes are shown by curves indicated by solid lines in FIG. 12. As shown by the solid lines in FIG. 12, it becomes possible to obtain an effective detection output, whose polarity (FIG. 12 shows the case where the polarity is positive) is always correct with respect to the transmission data. Furthermore, dotted lines in FIG. 12 indicate detection outputs after being passed through the low-pass filters 1810 and 1811. By using the low-pass filters 1810 and 1811 to allow a detection output to pass therethrough, even if the detection output momentarily becomes zero and disappears, it becomes possible to obtain another detection output formed by combining effective outputs which are obtained at a plurality of time points during the symbol. Thus, the diversity effect can be achieved.

Next, a case where the delay dispersion in the propagation path cannot be ignored will be described.

Figure 13:
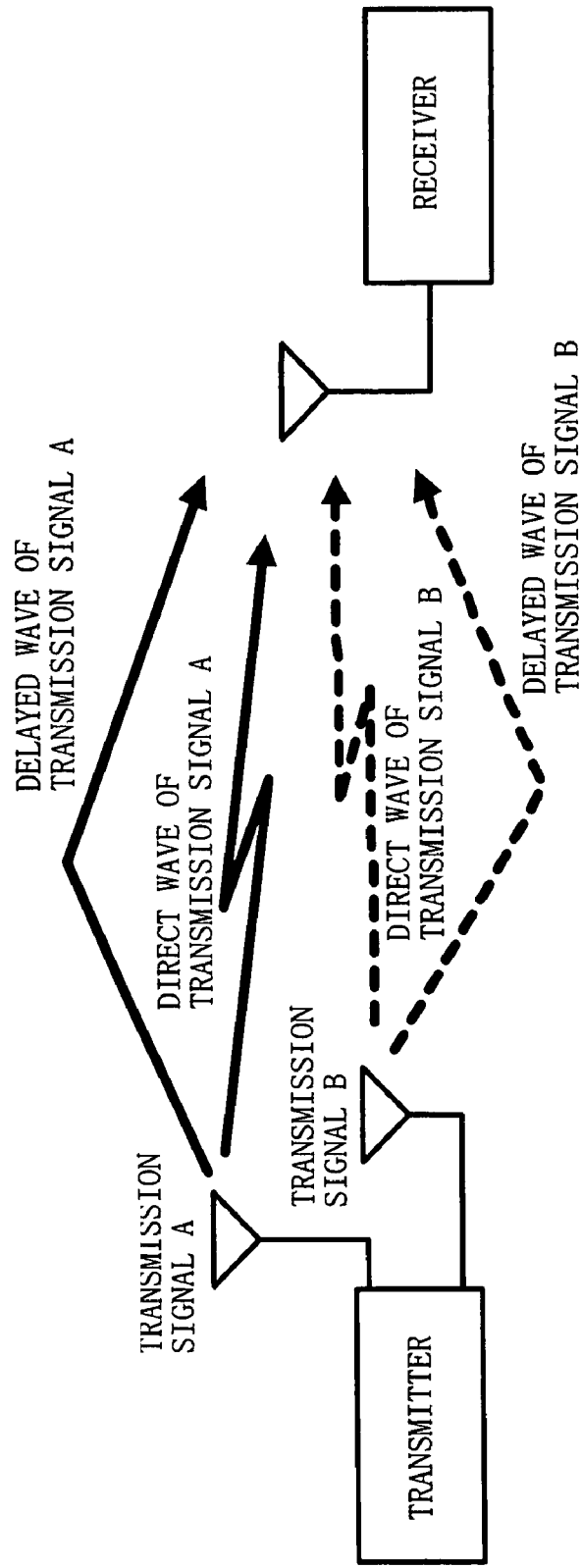
FIG. 13 is a conceptual diagram illustrating a two-incoming-wave model in which two transmission antennas are used.

For the sake of brevity, a two-incoming-wave model, as shown in FIG. 13, in which two transmission antennas are provided and an incoming signal is transmitted by two waves from each of the transmission antennas, will be described in the following descriptions. A case where a direct wave and delayed wave of the transmission signal A are received and a case where a direct wave and delayed wave of the transmission signal B are received will be firstly described, and then a case where all four incoming waves are received will be described.

Figure 14A:
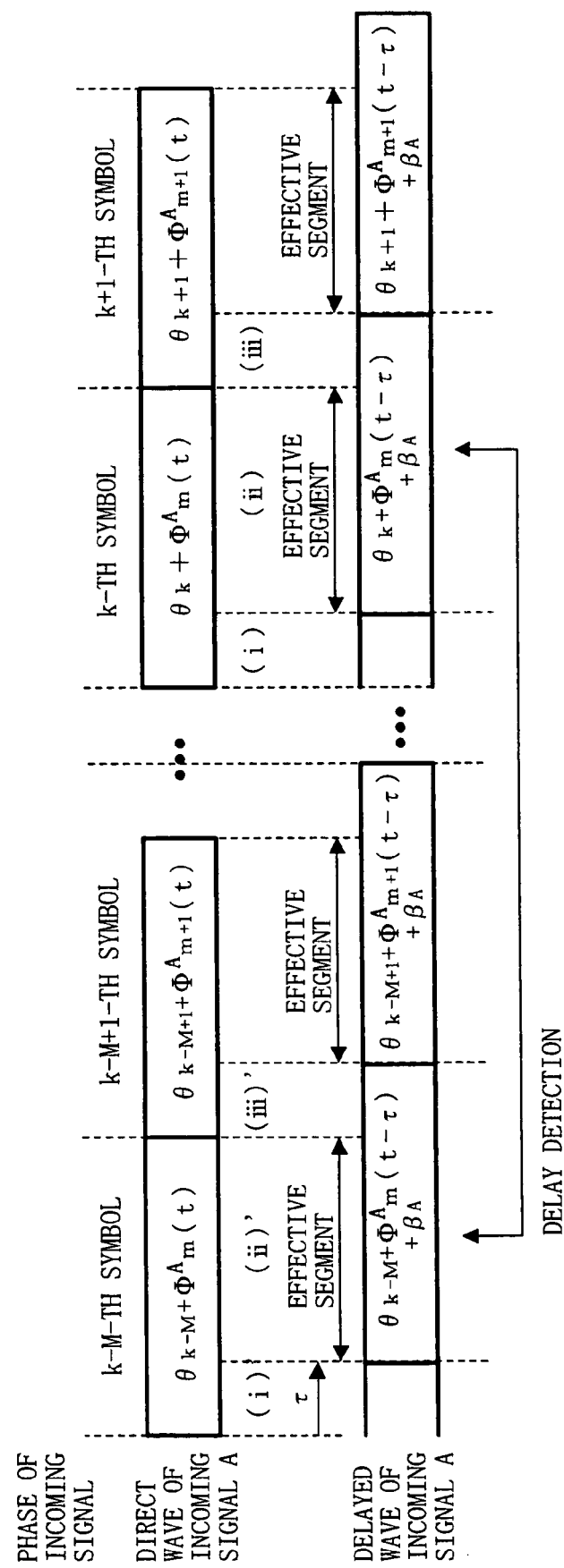
FIG. 14A is a schematic diagram illustrating phases of a direct wave and delayed wave of the transmission signal A, which change on a symbol-by-symbol basis.

FIG. 14A is a schematic diagram illustrating phases of the direct wave and delayed wave of the transmission signal A, which change on a symbol-by-symbol basis. Note that a phase difference between reception points of carrier waves which are the direct wave and the delayed wave is denoted by $\beta_A$. As a phase of the delayed wave, during the k-th symbol, a phase transition $\Phi^A_m(t-\tau)$, of a symbol waveform of the transmission signal A, which is delayed with respect to the direct wave by τ, is added to a combined phase, as an initial point, obtained by adding the phase difference $\beta_A$ between the signals to a phase $\theta_k$ of a signal point varied in accordance with the transmission data. Similarly, as the phase of the delayed wave, during the k-M-th symbol, the phase transition $\Phi^A_m(t-\tau)$, of the symbol waveform of the transmission signal A, which is similar to that of the k-th symbol, is added to a phase $\theta_{k-M}$, an initial point, of the signal point.

Therefore, when the delay detection is performed for the k-th symbol and the k-M-th symbol, an effective interval in which a correct polarity and correct demodulated data can be obtained is an interval (ii) of the k-th symbol or an interval (ii)' of the k-M-th symbol. Intervals (i) and (iii) immediately preceding and following the interval (ii) and intervals (i)' and (iii)' immediately preceding and following the interval (ii)' are intervals to which different signals of adjacent symbols are transmitted in a mixed manner, thereby causing an interference between the symbols. Thus, the correct demodulated data is not necessarily obtained in the aforementioned intervals.

Figure 14B:
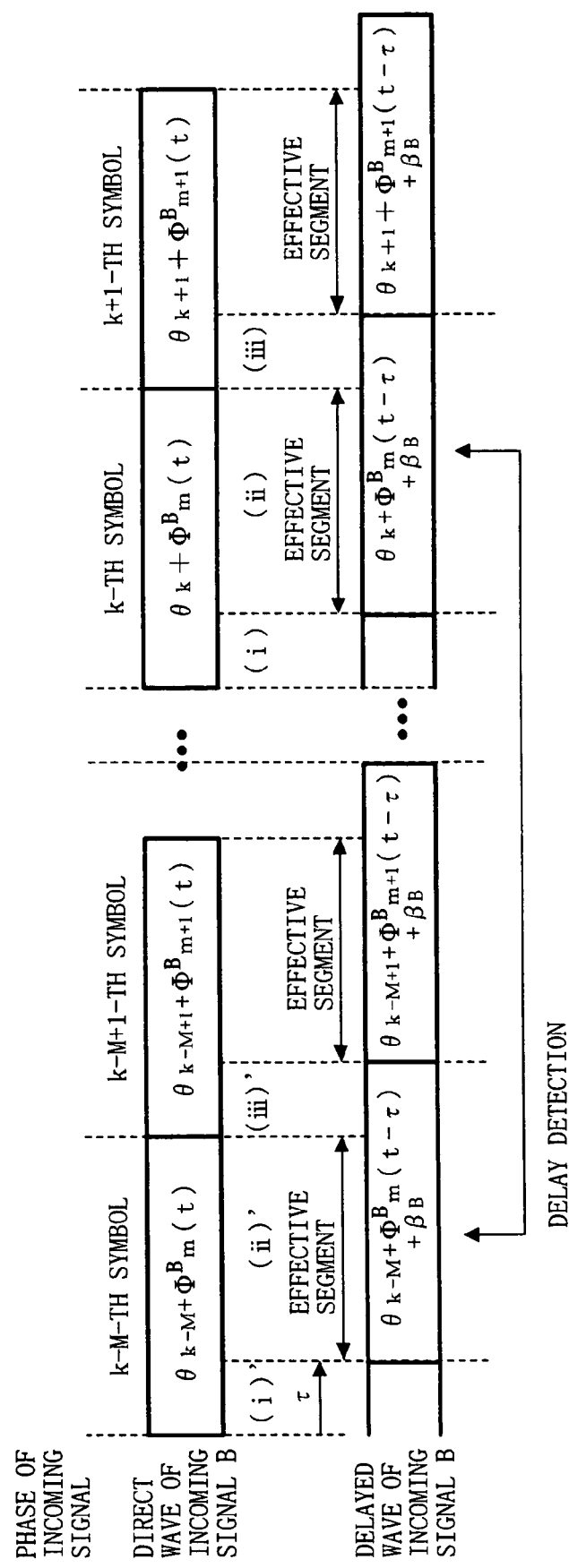
FIG. 14B is a schematic diagram illustrating phases of a direct wave and delayed wave of the transmission signal B, which change on a symbol-by-symbol basis.

FIG. 14B is a schematic diagram illustrating phases of the direct wave and delayed wave of the transmission signal B, which change on a symbol-by-symbol basis. The same principle is true of the phase of the transmission signal B only when $\beta_A$ and $\Phi^A_m(t-\tau)$ in the above descriptions are replaced with $\beta_B$ denoting a phase difference between reception points of carrier waves which are the direct wave and the delayed wave and $\Phi^B_m(t-\tau)$ denoting a phase transition of a symbol waveform of the transmission signal B which is delayed with respect to the direct wave by τ, respectively. Note that in the present embodiment, a delay difference between the direct wave and delayed wave of the transmission signal A and a delay difference between the direct wave and delayed wave of the transmission signal B are both τ. However, even if the delay difference between the direct wave and delayed wave of the transmission signal A and the delay difference between the direct wave and delayed wave of the transmission signal B are different from each other, the same improved effect can be obtained.

Figure 15:
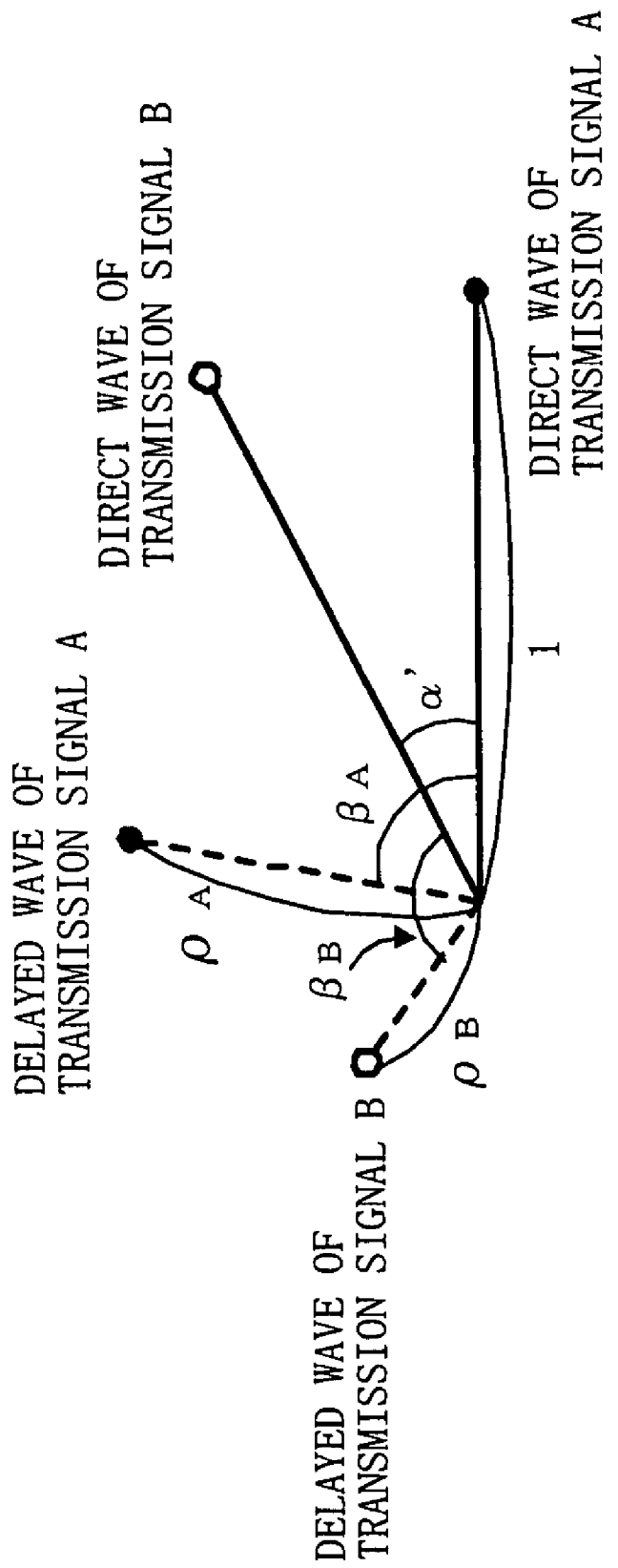
FIG. 15 is a diagram illustrating a phase relationship between reception points of the carrier waves which are the direct wave and the delayed wave of each of the transmission signals A and B.

FIG. 15 is a diagram illustrating a phase relationship between the reception points of the carrier waves which are the direct wave and the delayed wave of each of the transmission signals A and B. In addition to $\beta_A$ and $\beta_B$, a phase difference between a carrier wave of the direct wave of the transmission signal A and a carrier wave of the direct wave of the transmission signal B is denoted by α'. Also, amplitudes of the delayed waves of the transmission signals A and B, which are obtained based on those of the direct waves of the transmission signals A and B, are denoted by $\rho_A$ and $\rho_B$, respectively. For the sake of brevity, it is assumed that the amplitude of the direct wave of the transmission signal A is the same as that of the direct wave of the transmission signal B, since no difference will be made in the following descriptions on an operation and improved effect.

Figure 16A:
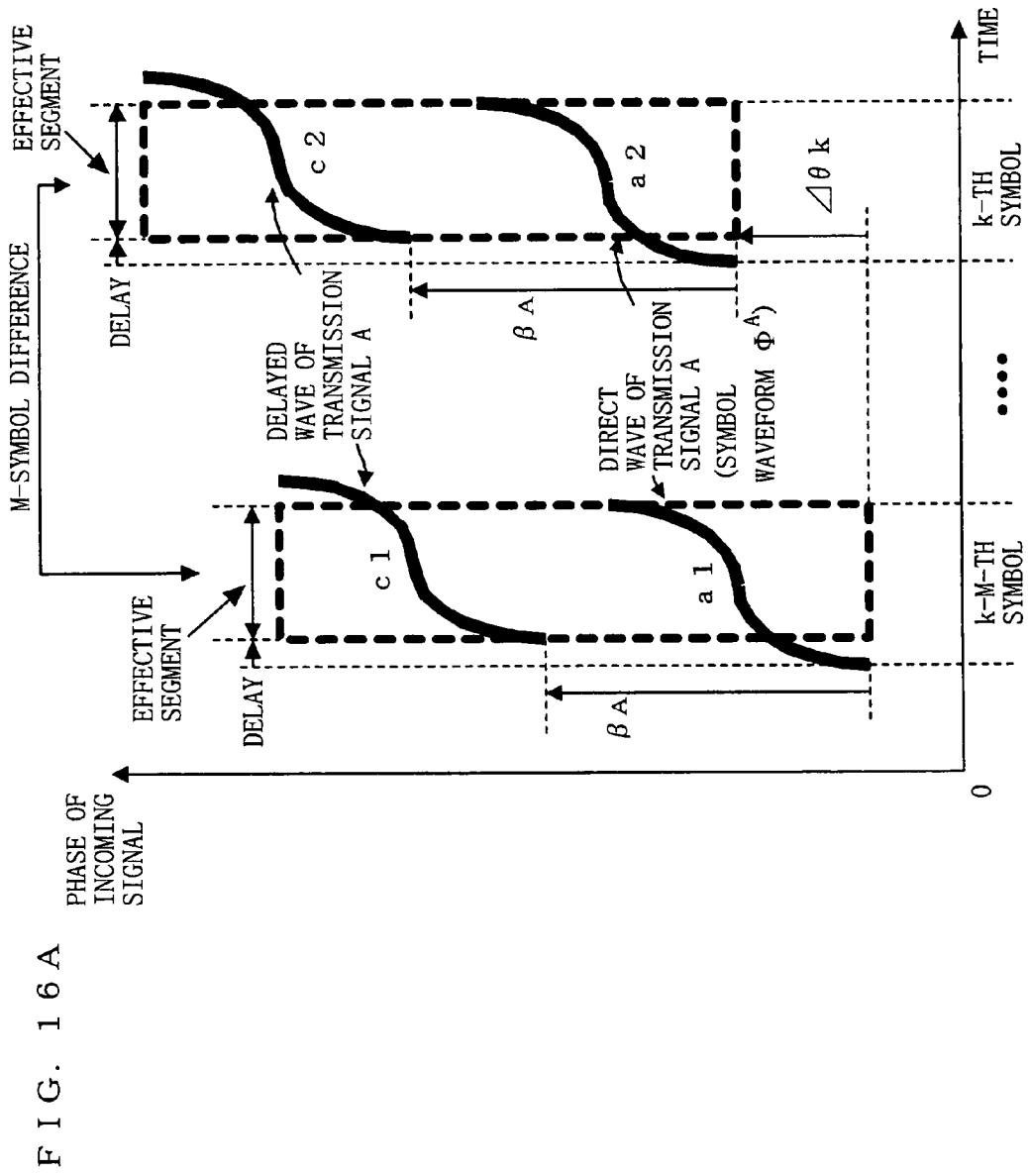
FIG. 16A is a schematic phase transition diagram illustrating a phase relationship between the direct wave and the delayed wave of the transmission signal A and a phase relationship between different symbols.
Figure 16B:
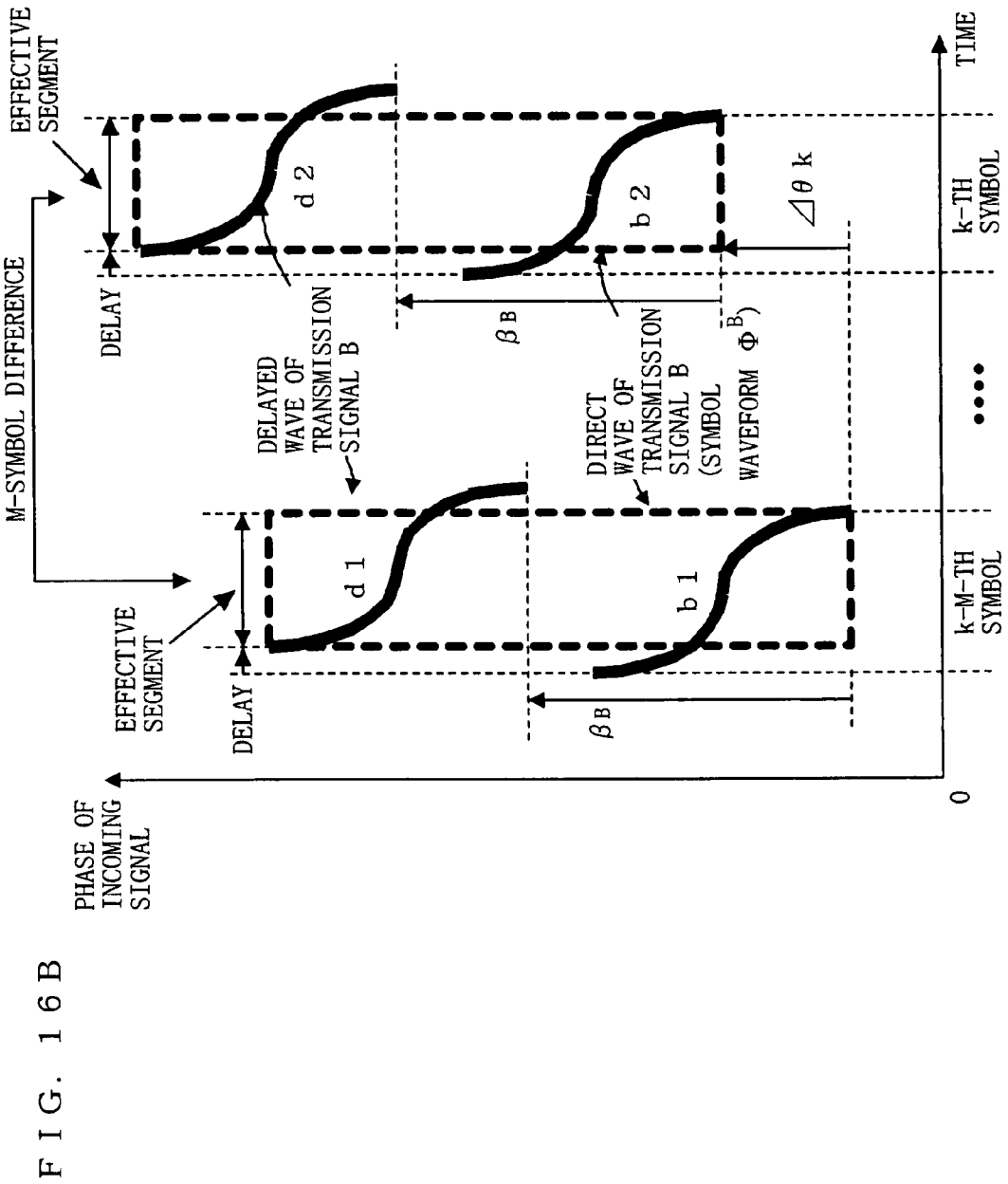
FIG. 16B is a schematic phase transition diagram illustrating a phase relationship between the direct wave and the delayed wave of the transmission signal B and a phase relationship between different symbols.

FIG. 16A is a schematic phase transition diagram illustrating a phase relationship between the direct wave and the delayed wave of the transmission signal A and a phase relationship between different symbols. Note that in this example, $\Phi^A$ shown in (a) of FIG. 4 is used as a phase transition of the symbol waveform of the transmission signal A. In FIG. 16A, during the k-M-th symbol, the phase of the direct wave changes as shown by the phase transition a1, and the phase of the delayed wave changes as shown by a phase transition c1 from a phase point shifted from the initial point of the phase transitional by the phase difference $\beta_A$. During the k-th symbol, the phase of the direct wave changes as shown by the phase transition a2 from a phase point shifted from the initial point of the phase transitional of the k-M-th symbol by a phase $\Delta\theta_k$ caused by the differential encoding, and the phase of the delayed signal changes as shown by the phase transition c2 from the phase point shifted from the initial point of the phase transition a2 by the phase difference $\beta_A$. Therefore, by shifting the phases of the k-M-th symbol by the phase $\Delta\theta_k$ caused by the differential encoding, the phase transitions a1 and c1 of the k-M-th symbol become the phase transitions a2 and c2 of the k-th symbol. Thus, the delay detection is performed for the k-th symbol based on the k-M-th symbol, thereby obtaining the phase $\Delta\theta_k$ caused by the differential encoding. As a result, the data can be demodulated. The same relationship is also applied for a schematic phase transition diagram illustrating a phase relationship between the direct wave and the delayed wave of the transmission signal B during different symbols as shown in FIG. 16B.

Next, the phase relationship between the direct wave and delayed wave of the transmission signal A will be described with reference to a vector diagram.

Figure 17A:
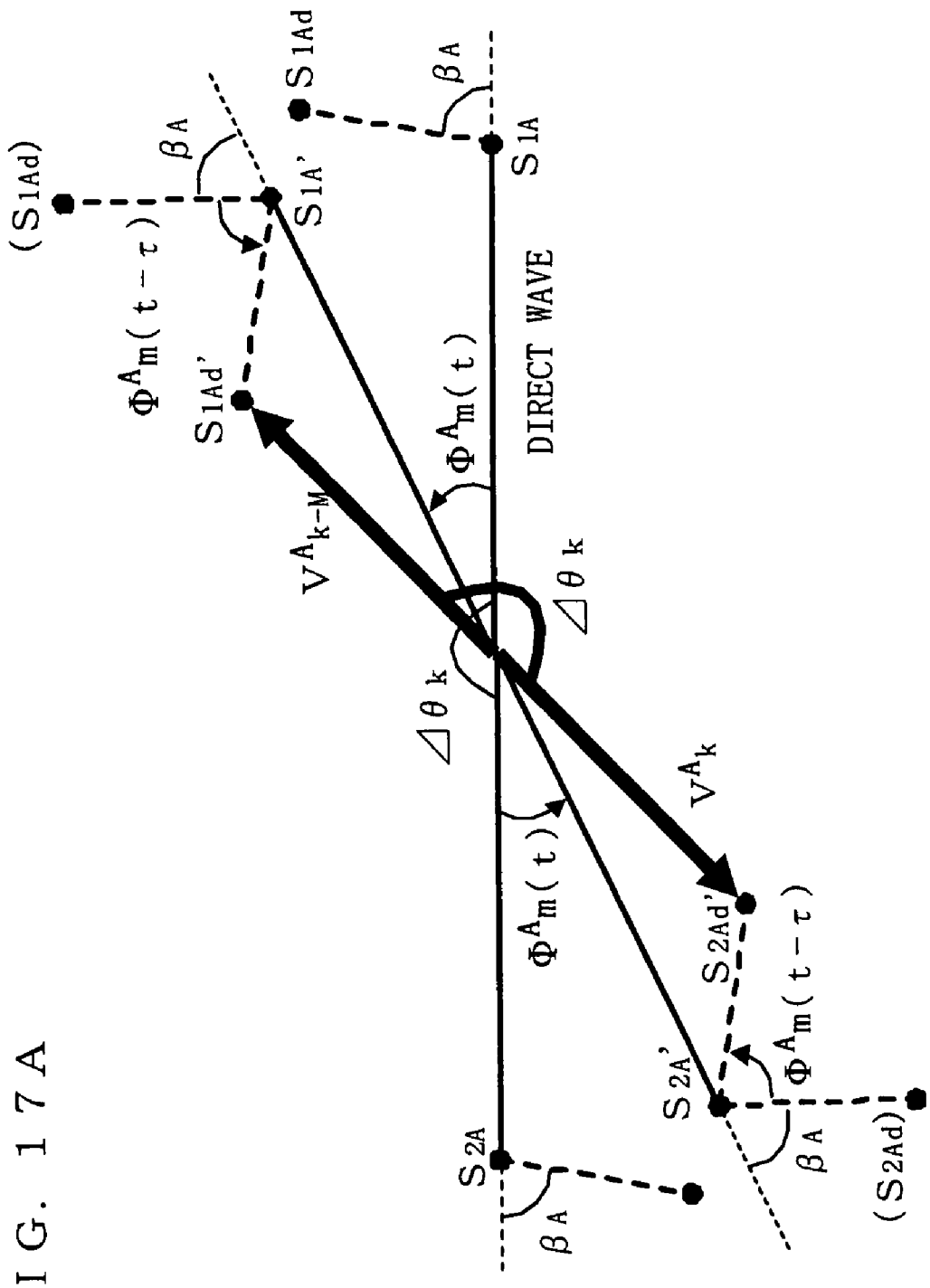
FIG. 17A is a schematic diagram illustrating the phase transition, represented by vectors, between the direct wave and delayed wave of the transmission signal A.

FIG. 17A is a schematic diagram illustrating phase transitions, represented by vectors, of the direct wave and delayed wave of the transmission signal A. In the present embodiment, only the effective intervals (ii) and (ii)' shown in FIG. 14A will be described. FIG. 17A represents the transmission data, and shows an exemplary case where a phase difference $\Delta\theta_k$, between two symbols, for which the detection is to be performed, which are separated from each other by M symbols, is n. In FIG. 17A, a signal point of the k-M-th symbol and a signal point of the k-th symbol are denoted by $S_{1A}$ and $S_{2A}$, respectively.

During the k-M-th symbol, a vector $S_{1Ad}$ representing the delayed wave is different from a vector $S_{1A}$ representing the direct wave by $\beta_A$. The phase of the direct wave changes in accordance with $\Phi^A_m(t)$ from the vector $S_{1A}$ as time elapses, and is represented by a vector $S_{1A}'$ at the arbitrary time t. The phase of the delayed wave changes in accordance with $\Phi^A_m(t-T)$ from the vector $S_{1Ad}$ as time elapses, and is represented by a vector $S_{1Ad}'$ at the time t. In this case, a vector representing a received wave at the time t is denoted by $V^A_{k-M}$.

Similarly, during the k-th symbol, a vector $S_{2A}$ representing the delayed wave is different from a vector $S_{1A}$ by $\Delta\theta_k$, and a vector $S_{2Ad}$ representing the delayed wave is different from the vector $S_{2A}$ by $\beta_A$. The phase of the direct wave changes in accordance with $\Phi^A_m(t)$ from the vector $S_{2A}$ as time elapses, and is represented by a vector $S_{2A}'$ at the arbitrary time t. The phase of the delayed wave changes in accordance with $\Phi^A_m$ (t-$\tau$) from the vector $S_{2Ad}$ as time elapses, and is represented by a vector $S_{2Ad}'$ at the arbitrary time t. In this case, a vector representing a received wave at the time t is denoted by $V^A_k$.

As described above, the phases of the direct wave and delayed wave of the transmission signal A change in a similar manner during each of the k-M-th symbol and the k-th symbol. Thus, a phase difference between two received waves represented by the vectors $V^A_k$ and $V^A_{k-M}$ is always $\Delta\theta_k$ at the arbitrary time t.

Figure 17B:
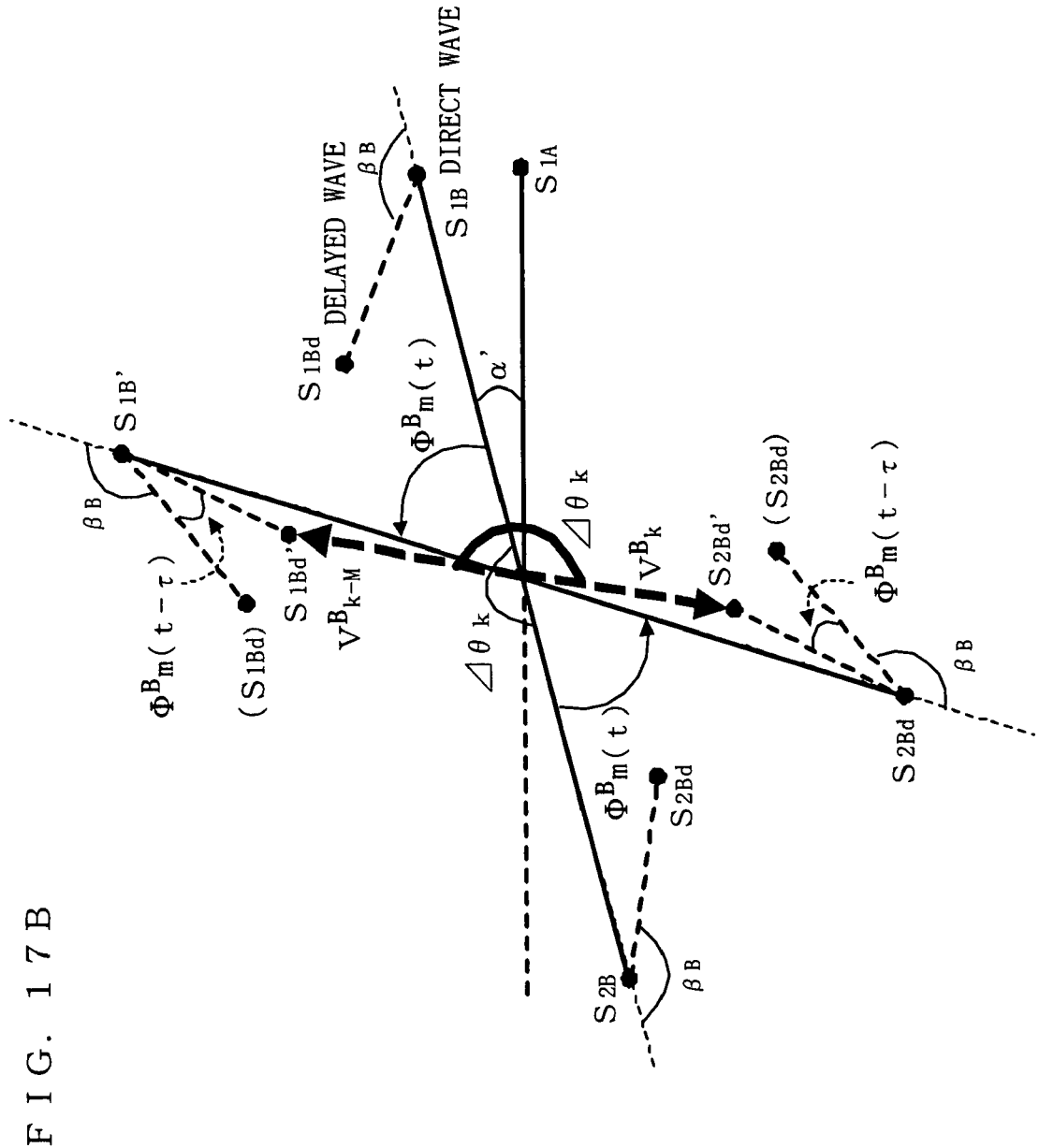
FIG. 17B is a schematic diagram illustrating the phase transition, represented by vectors, between the direct wave and delayed wave of the transmission signal B.

FIG. 17B is a schematic diagram illustrating phase transitions, represented by vectors, of the direct wave and delayed wave of the transmission signal B. Also in the present embodiment, only the effective intervals (ii) and (ii)' shown in FIG. 14B will be described. FIG. 17B also represents the transmission data, and shows an exemplary case where a phase difference $\Delta\theta_k$, between two symbols, for which the detection is to be performed, which are separated from each other by M symbols, is n. In FIG. 17B, a signal point $S_{1B}$ of the transmission signal B is at a position from which the signal point $S_{1A}$ of the transmission signal A of the k-M-th symbol is rotated by the phase difference $\alpha'$, and a signal point $S_{2B}$ of the transmission signal B of the k-th symbol is at a position from which the signal point $S_{1B}$ of the transmission signal B is further rotated by $\Delta\theta_k$.

During the k-M-th symbol, a vector $S_{1Bd}$ representing the delayed wave is different from a vector $S_{1B}$ representing the direct wave by $\beta_B$. Then, the phase of the direct wave changes in accordance with $\Phi^B_m(t)$ from the vector $S_{1B}$ as time elapses, and is represented by a vector $S_{1B}'$ at the arbitrary time t. In this case, a vector representing the received wave at the time t is denoted by $V^B_{k-M}$.

Similarly, during the k-th symbol, a vector $S_{2B}$ representing the direct wave is different from the vector $S_{1B}$ by $\Delta\theta_k$, and a vector $S_{2Bd}$ representing the delayed wave is different from the vector $S_{2B}$ representing the direct wave by $\beta_B$. The phase of the direct wave changes in accordance with $\Phi^B_m(t)$ from the phase represented by the vector $S_{2B}$ as time elapses, and is represented by a vector $S_{2B}'$ at the arbitrary time t. The phase of the delayed wave changes in accordance with $\Phi^B_m(t-\tau)$ from the vector $S_{2Bd}$ as time elapses, and is represented by a vector $S_{2Bd}'$ at the arbitrary time t. In this case, a vector representing the received wave at the time t is denoted by $V^B_k$. As described above, the phases of the direct wave and delayed wave of the transmission signal B change in a similar manner during each of the k-M-th symbol and the k-th symbol. Thus, a phase difference between the two received waves represented by the vectors $V^B_k$ and $V^B_{k-M}$ is always $\Delta\theta_k$ at the arbitrary time t.

Figure 18:
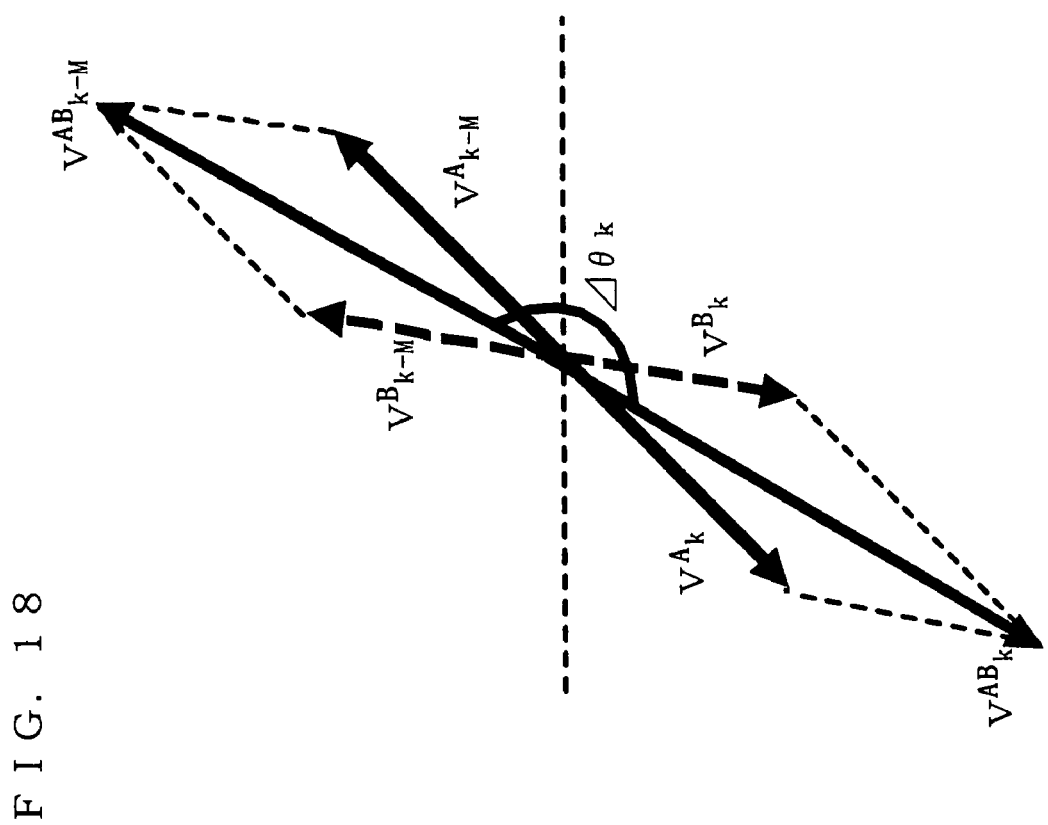
FIG. 18 is a diagram illustrating phase transitions, represented by vectors, of all incoming waves.

After all, in a case where all four incoming waves shown in FIG. 13 are transmitted, an incoming wave represented by a vector sum $V^{AB}_{k-M}$ of the vectors $V^A_{k-M}$ and $V^B_{k-M}$ is received during the k-M-th symbol, and an incoming wave represented by a vector sum $V^{AB}_k$ of the vectors $V^A_k$ and $V^B_k$ is received during the k-th symbol, as shown in FIG. 18. In the above case, a phase difference between the incoming wave represented by the vector sum $V^{AB}_{k-M}$ and the incoming wave represented by the vector sum $V^{AB}_k$ is also always $\Delta\theta_k$ at the arbitrary time within an effective interval. This indicates that as long as the vectors $V^A_k$ and $V^B_k$ (or $V^A_{k-M}$ and $V^B_{k-M}$) do not cancel each other out, or as long as the direct wave and delayed wave transmitted from each of the two antennas do not cancel each other out and the vectors $V^A_k$ and $V^B_k$ (or $V^A_{k-M}$ and $V^B_{k-M}$) do not simultaneously disappear, i.e., even when a detection output obtained by performing the delay detection on a received signal may momentarily disappear, it is possible to obtain another detection output corresponding to the transmission data and always having a correct polarity, during a time period other than when the detection output momentarily disappears. That is, as described with reference to FIG. 11 and FIG. 12, even when a detection output may momentarily become zero, another detection output can be obtained during a time period other than when the detection output momentarily becomes zero. Furthermore, by using the low-pass filters to allow a detection output to pass therethrough, even if the detection output momentarily becomes zero and disappears, it becomes possible to obtain another detection output formed by combining effective outputs which are obtained at a plurality of time points during the symbol. Thus, the path diversity effect can be achieved.

As described above, according to the transmission method and transmission system of the embodiment of the present invention, the transmission device 100 performs differential encoding on the same transmission data, performs modulation by using different symbol waveforms, and respectively transmits signals thus obtained from different antennas, and the reception device 140 performs the delay detection on the received signals. Therefore, even when a delay difference or delay dispersion is caused by a path difference between the propagation paths, the error rate can be improved.

Figure 19:
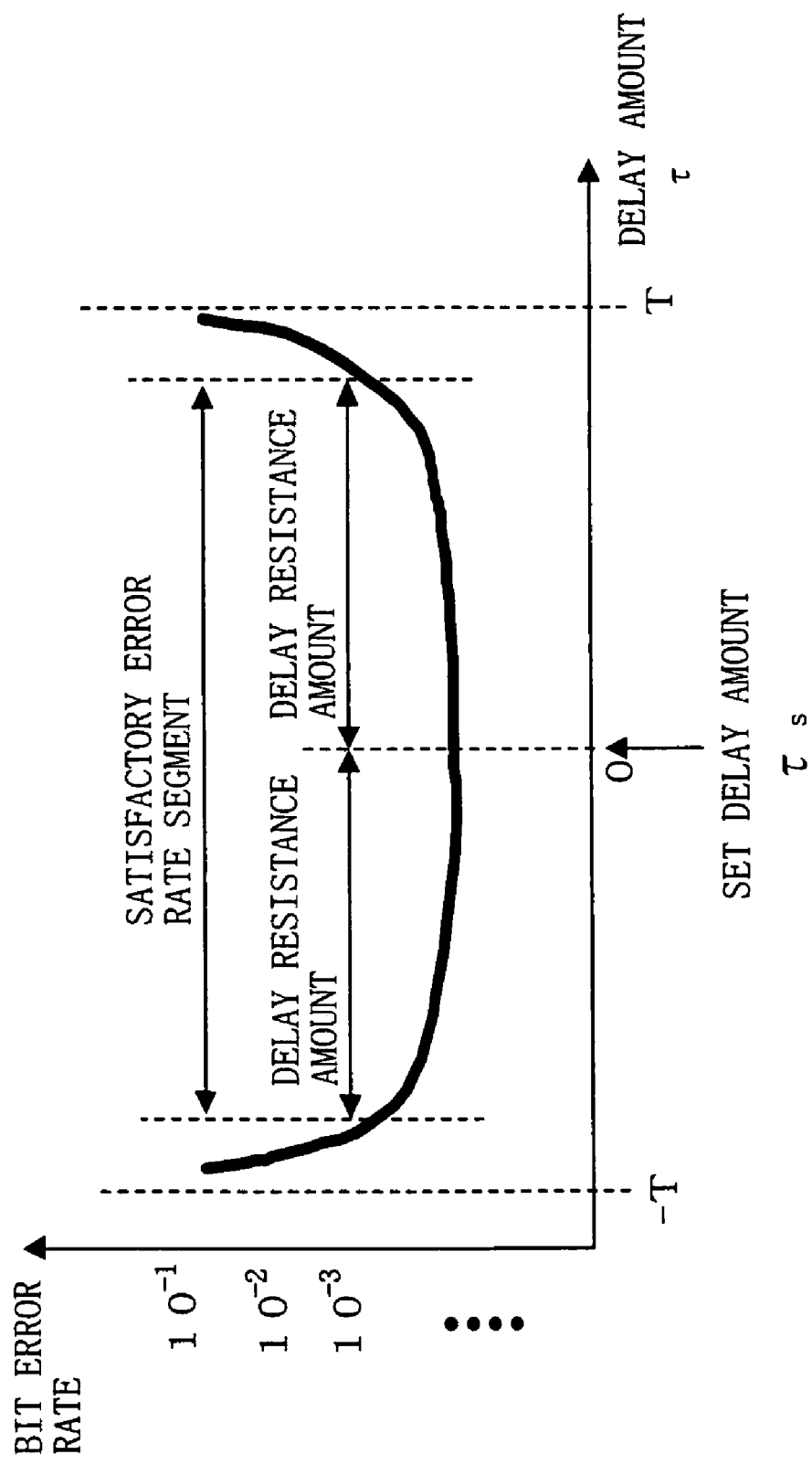
FIG. 19 is a schematic diagram illustrating a relationship between a bit error rate and a delay amount $\tau$ used in a transmission method of the present invention.
Figure 30:
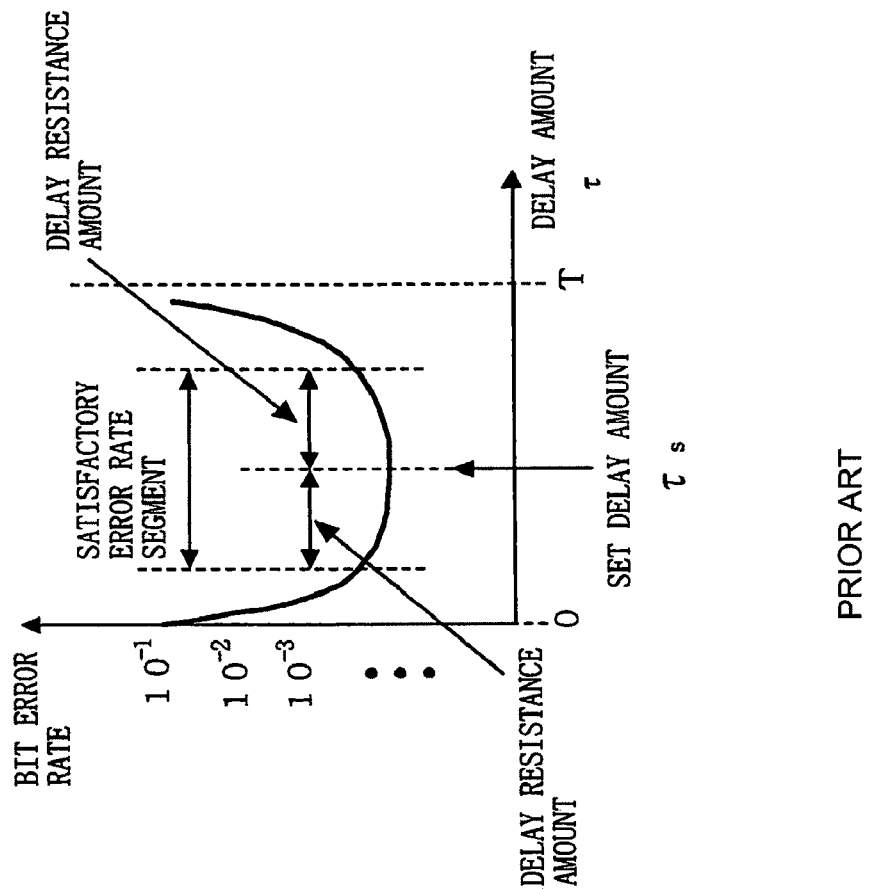
FIG. 30 is a schematic diagram illustrating a relationship between a bit error rate and the delay amount $\tau$ used in the conventional transmission system.

Similarly to FIG. 30, FIG. 19 is a schematic diagram illustrating a relationship between the bit error rate and the delay amount τ used in the transmission method according to the present invention. FIG. 19 is similar to FIG. 30 in that the effective interval becomes shorter as the delay amount τ becomes equal to the symbol length T (or −T), and then the effective interval finally disappears and the bit error rate starts to deteriorate. However, FIG. 19 is different from FIG. 30 in that the error rate shown in FIG. 19 is improved even when the delay amount τ is in the vicinity of 0. Thus, according to the present invention, unlike patent document 1, it is not always necessary to intentionally interpose a predetermined delay between the transmission signals. Instead, in the present invention, the delay amount is set at 0, i.e., no delay is interposed between the transmission signals, thereby obtaining a maximum amount of delay resistance. It is apparent that the delay resistance shown in FIG. 19 illustrating the aforementioned effect is significantly improved as compared to the relay resistance shown in FIG. 30.

Figure 27:
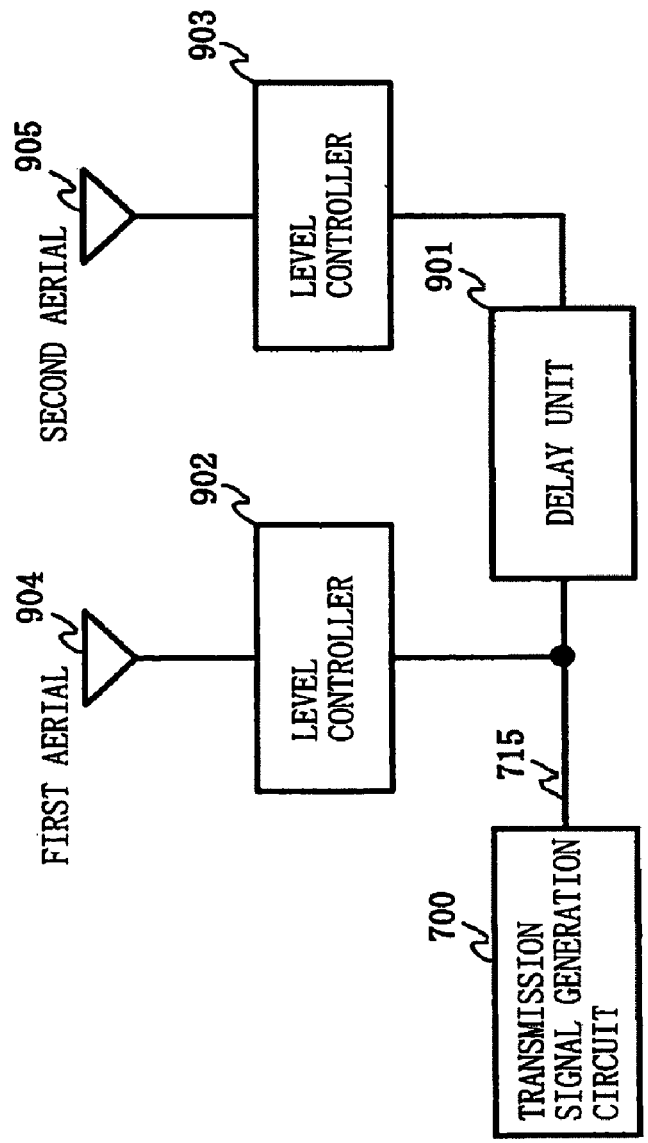
FIG. 27 is a schematic diagram illustrating a structure of the conventional transmission system.
Figure 28:
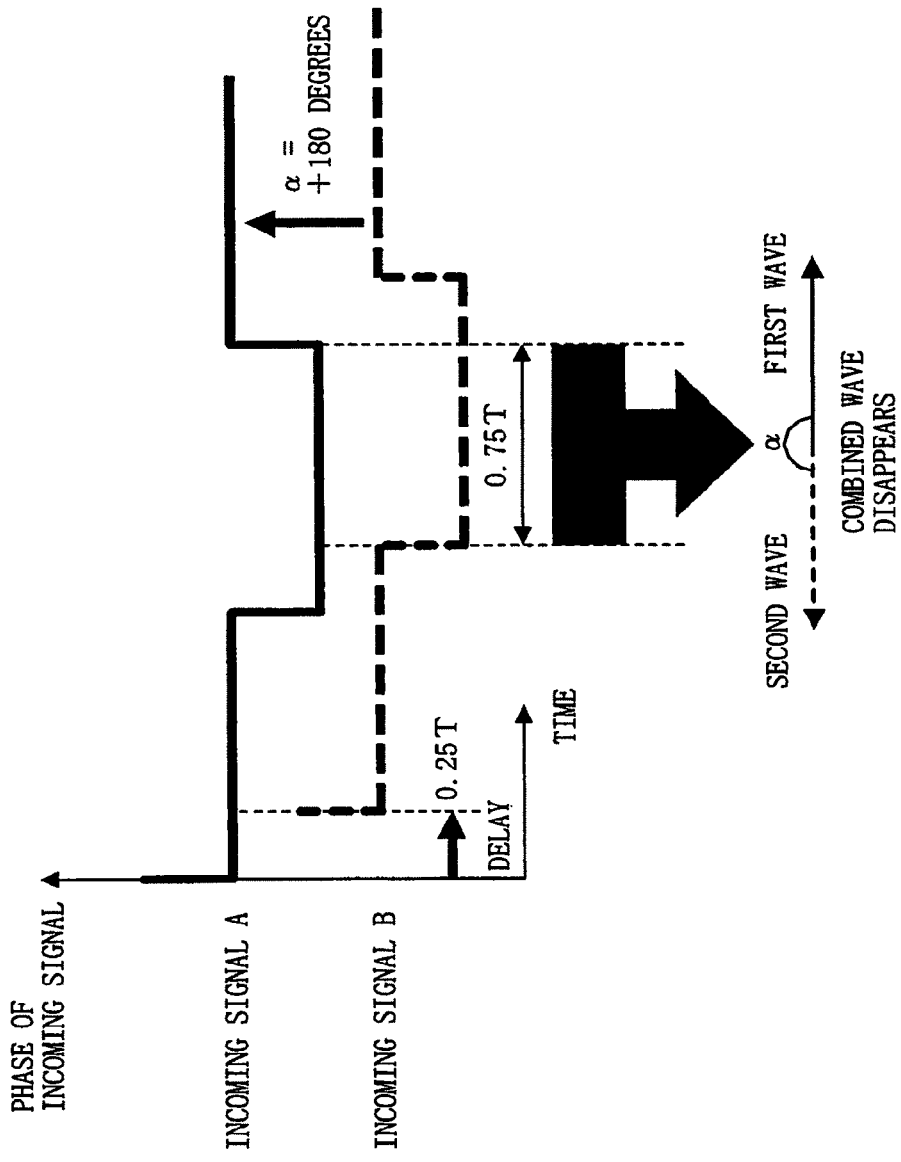
FIG. 28 is a schematic diagram illustrating a phase relationship between two incoming wave signals which are to be combined with each other at a reception end in the conventional phase modulation scheme.
Figure 29:
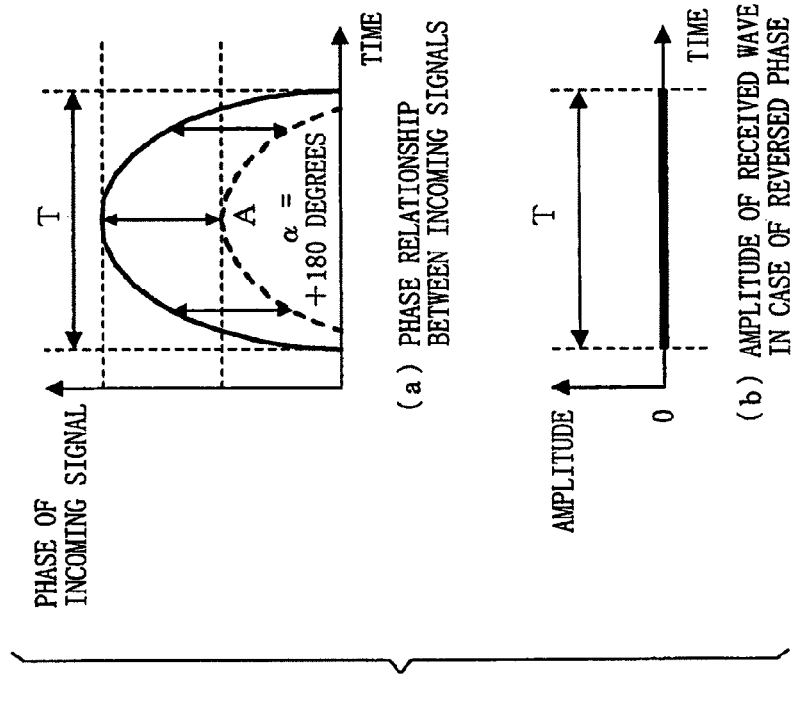
FIG. 29 is a schematic diagram illustrating a case where a phase relationship between the incoming signals is reversed in the modulation scheme.

Note that FIG. 27 shows a special structure obtained when a delay time difference between the direct wave and delayed wave transmitted from the transmission signal A and a delay time difference between the direct wave and delayed wave transmitted from the transmission signal B are both τ in the two-incoming-wave model shown in FIG. 13. Thus, in a case of the structure shown in FIG. 27, a delay may be intentionally inserted. If a delay difference is regularly caused by a path difference between propagation paths from the respective antennas due to reasons of installation or structure, it is rather better to interpose the delay such that the signals cancel each other out, thereby making it possible to obtain a maximum resistance against the delay difference or delay dispersion caused by other factors. Furthermore, it is unnecessary to perform propagation path estimation and its follow-up process at the reception side. Thus, the effect can be maintained even under an environment where a propagation path from a high-speed mobile unit or the like varies at high speed.

Industrial Applicability

The present invention is applicable to a transmission system or the like using a transmission diversity which transmits signals by using a plurality of transmission antennas, and is particularly useful when used under an electric wave propagation environment where a size or performance of a reception terminal is limited and propagation path characteristics vary at high speed. For example, the present invention is applicable to a radio IC tag system, a road-to-vehicle communication system, vehicle-to-vehicle communication system and vehicle-to-human communication system, all of which include communication performed with a high-speed mobile unit, etc.

The invention claimed is:

1. A transmission method of transmitting modulated signals modulated based on same transmission data from a transmission side to a reception side by using a plurality of transmission antennas, the transmission method comprising the steps of:
    at the transmission side,
        generating, based on the transmission data, a plurality of modulated signals, in which symbol waveforms include at least two symbol waveforms having different phase transitions from each other, each of the at least two symbol waveforms having a second-order differential coefficient representing a chronological change of phase that is not always zero during one symbol period, and
        transmitting the plurality of generated modulated signals from the plurality of the transmission antennas, respectively; and
    at the reception side,
        receiving the plurality of modulated signals transmitted from the plurality of the transmission antennas by a reception antenna,
        detecting the received modulated signals, and
        decoding detection signals obtained by the detection so as to obtain received data.

2. The transmission method according to claim 1, wherein at the transmission side, the plurality of modulated signals are generated such that the symbol waveforms of any two symbols separated from each other by a predetermined number of symbols are identical with each other regardless of the transmission data, and the plurality of modulated symbols are generated such that a phase difference between the any two symbols is determined based on the transmission data.

3. The transmission method according to claim 2, wherein at the transmission side, the plurality of modulated signals are generated when the predetermined number of symbols is set to be 1.

4. The transmission method according to claim 2, wherein at the transmission side, any angle obtained by equally dividing $2\pi$ by a number corresponding to a power of 2 is used as the phase difference.

5. The transmission method according to claim 1, wherein at the reception side, the detection signals are obtained by performing a delay detection.

6. A transmission method of transmitting modulated signals modulated based on same transmission data from a transmission side to a reception side by using a plurality of transmission antennas, the transmission method comprising the steps of:
    at the transmission side,
        generating a plurality of modulated signals, in which symbol waveforms during a same symbol period are different from each other, based on the transmission data, and
        transmitting the plurality of generated modulated signals from the plurality of the transmission antennas, respectively; and
    at the reception side,
        receiving the plurality of modulated signals transmitted from the plurality of the transmission antennas by a reception antenna, detecting the received modulated signals, and
decoding detection signals obtained by the detection so as to obtain received data,
wherein at the transmission side, at least a first symbol waveform having a phase which increases in a chronological direction and having a phase transition in which a second-order differential coefficient representing a chronological change of the phase is not always zero during one symbol period, and a second symbol waveform having a phase which decreases in the chronological direction and having a phase transition in which the second-order differential coefficient representing the chronological change of the phase is not always zero during the one symbol period, are generated.

7. The transmission method according to claim 6, wherein at the transmission side, the first symbol waveform and the second symbol waveform are generated such that an amount of the chronological change of the phase in the phase transition of the first symbol waveform and the second symbol waveform decreases before a predetermined point during the one symbol period and increases after the predetermined point during the one symbol period.

8. The transmission method according to claim 7, wherein at the transmission side, when the predetermined point is set at a center of the one symbol period, the first symbol waveform and the second symbol waveform are generated such that the phases in the phase transitions of the first symbol waveform and the second symbol waveform before the center of the one symbol period and the phases in the phase transitions of the first symbol waveform and the second symbol waveform after the center of the one symbol period are symmetrically changed.

9. The transmission method according to claim 6, wherein at the transmission side, the first symbol waveform and the second symbol waveform are generated such that an amount of the chronological change of the phase in the phase transitions of the first symbol waveform and the second symbol waveform increases before a predetermined point during the one symbol period and decreases after the predetermined point during the one symbol period.

10. The transmission method according to claim 9, wherein at the transmission side, when the predetermined point is set at a center of the one symbol period, the first symbol waveform and the second symbol waveform are generated such that the phases in the phase transitions of the first symbol waveform and the second symbol waveform before the center of the one symbol period and the phases in the phase transitions of the first symbol waveform and the second symbol waveform after the center of the one symbol period are symmetrically changed.

11. The transmission method according to claim 6, wherein at the transmission side, the first symbol waveform and the second symbol waveform are generated such that an amount of the chronological change of the phase in the phase transitions of the first symbol waveform and the second symbol waveform decreases during an entirety of the one symbol period.

12. The transmission method according to claim 6, wherein at the transmission side, the first symbol waveform and the second symbol waveform are generates such that an amount of the chronological change of the phase in the phase transitions of the first symbol waveform and the second symbol waveform increases during an entirety of the one symbol period.

13. A transmission method of transmitting modulated signals modulated based on same transmission data from a transmission side to a reception side by using a plurality of transmission antennas, the transmission method comprising the steps of:
at the transmission side,
generating a plurality of modulated signals, in which symbol waveforms during a same symbol period are different from each other, based on the transmission data, and
transmitting the plurality of generated modulated signals from the plurality of the transmission antennas, respectively; and
at the reception side,
receiving the plurality of modulated signals transmitted from the plurality of the transmission antennas by a reception antenna,
detecting the received modulated signals, and
decoding detection signals obtained by the detection so as to obtain received data,
wherein at the transmission side, at least a first symbol waveform having a phase which increases in a chronological direction before a predetermined point during one symbol period and decreases after the predetermined point during the one symbol period, and having a phase transition in which a second-order differential coefficient representing a chronological change of the phase is not always zero, and a second symbol waveform having a phase which decreases in the chronological direction before the predetermined point during the one symbol period and increases after the predetermined point during the one symbol period, and having a phase transition in which the second-order differential coefficient representing the chronological change of the phase is not always zero, are generated.

14. The transmission method according to claim 13, wherein
at the transmission side, when the predetermined point is set at a center of the one symbol period, the first symbol waveform and the second symbol waveform are generated such that phases in the phase transitions of the first symbol waveform and the second symbol waveform before the center of the one symbol period and the phases in the phase transitions of the first symbol waveform and the second symbol waveform after the center of the one symbol period are symmetrically changed.

15. A transmission system comprising: a transmission device including a plurality of transmission antennas, wherein the transmission device transmits modulated signals modulated based on same transmission data by using the plurality of transmission antennas; and a reception device which receives the modulated signals transmitted from the transmission device by a reception antenna,
wherein the transmission device further includes:
a differential encoding section for differentially encoding the transmission data and generating differentially encoded signals;
a plurality of waveform generating sections for respectively modulating the differentially encoded signals by means of a plurality of symbol waveforms which are previously stored therein, and generating a plurality of modulated signals, in which symbol waveforms include at least two symbol waveforms having different phase transitions from each other, each of the at least two symbol waveforms having a second-order differential coefficient representing a chronological change of phase that is not always zero during one symbol period; and a plurality of RF quadrature modulation sections for respectively performing quadrature modulation on the plurality of modulated signals so as to be converted into signals having carrier wave frequency bands, wherein the plurality of transmission antennas respectively transmit the plurality of modulated signals whose frequency bands have been converted into the carrier wave frequency bands, and wherein the reception device includes:
- a reception antenna for receiving the plurality of signals transmitted from the plurality of transmission antennas;
- a delay detection section for performing a delay detection process and low-pass filtering process on the received signals, and generating detection signals; and
- a data determination section for determining data of the detection signals and outputting received data.

16. A transmission method of transmitting modulated signals modulated based on same transmission data from a transmission side to a reception side by using a plurality of transmission antennas, wherein a plurality of modulated signals, in which symbol waveforms are generated based on the transmission data, the symbol waveforms including at least two symbol waveforms having different phase transitions from each other, and each of the at least two symbol waveforms having a second-order differential coefficient representing a chronological change of phase that is not always zero during one symbol period, and the plurality of generated modulated signals are respectively transmitted from the plurality of the transmission antennas.

17. A transmission device which transmits modulated signals modulated based on same transmission data by using a plurality of transmission antennas, wherein a differential encoding section for differentially encoding the transmission data and generating differentially encoded signals;

a plurality of waveform generating sections for respectively modulating the differentially encoded signals by means of a plurality of symbol waveforms which are previously stored therein, and generating a plurality of modulated signals, in which symbol waveforms include at least two symbol waveforms having different phase transitions from each other, each of the at least two symbol waveforms having a second-order differential coefficient representing a chronological change of phase that is not always zero during one symbol period.

* * * * *